United States Patent [19]
Domel

[11] Patent Number: 5,157,565
[45] Date of Patent: Oct. 20, 1992

[54] TAPE CASSETTE LOADING MECHANISM

[75] Inventor: Douglas R. Domel, Chatsworth, Calif.

[73] Assignee: Distributed Logic Corporation, Anaheim, Calif.

[21] Appl. No.: 531,316

[22] Filed: May 31, 1990

[51] Int. Cl.$^5$ .............................................. G11B 15/68
[52] U.S. Cl. ........................................................ 360/92
[58] Field of Search ............ 360/92; 414/796.9, 797.8, 414/797.9, 932

[56] References Cited

U.S. PATENT DOCUMENTS

| | | | |
|---|---|---|---|
| 3,667,624 | 6/1972 | Ogura et al. | 214/8.5 A |
| 3,767,207 | 10/1973 | Okabe | 274/4 F |
| 3,854,004 | 12/1974 | Baumel et al. | 178/6 |
| 3,886,591 | 5/1975 | Bettini | 360/92 |
| 4,415,301 | 11/1983 | Zielke | 414/31 |
| 4,594,042 | 6/1986 | Hoftman | 414/32 |
| 4,757,401 | 7/1988 | Teranishi | 360/98 |
| 4,770,593 | 9/1988 | Anderson | 414/331 |
| 4,787,533 | 11/1998 | Haroutel et al. | 221/12 |
| 4,835,634 | 5/1989 | Ostwald | 360/92 |
| 4,846,619 | 7/1989 | Crabtree et al. | 414/273 |
| 4,850,485 | 7/1989 | Ishikawa | 206/387 |
| 4,860,133 | 8/1989 | Baranski | 360/92 |
| 4,991,041 | 2/1991 | Grant | 360/92 |
| 5,006,940 | 4/1991 | Hamachi et al. | 360/92 |
| 5,045,958 | 9/1991 | Leonard et al. | 360/92 |

*Primary Examiner*—Robert S. Tupper
*Attorney, Agent, or Firm*—Christie, Parker & Hale

[57] ABSTRACT

A cassette loader for a DAT cassette drive includes a specially-constructed, multi-chamber magazine which rides in an elevator to bring selected ones of a plurality of cassettes in the magazine into operative alignment with the inlet of the DAT cassette drive. A push-pull mechanism is positioned at a distance from the DAT cassette drive inlet so that the magazine is transported between the mechanism and the inlet. The mechanism includes a motor-driven scissors mechanism whose output arm extends into a selected one of the plurality of chambers in the magazine, thereby pushing the cassette out of the chamber and into the DAT drive. A latching means, carried on, and extending beyond, the end of the scissors output arm, is inserted between the cassette and the floor of the chamber containing it, through a slot which runs front-to-back along the floor, and hooks into a recess which is characteristic of DAT cassettes. When a cassette is ejected from the DAT drive into the selected chamber of the magazine, the scissors output arm is retracted, and the hook rides up a ramp at the end of the slot in the floor of the magazine chamber, into engagement with the cassette recess, thereby hooking into the cassette and drawing it out as the scissors arm retracts.

38 Claims, 21 Drawing Sheets

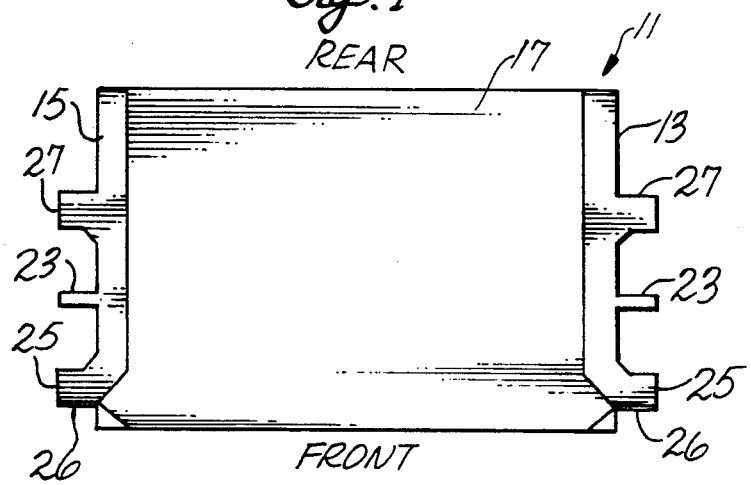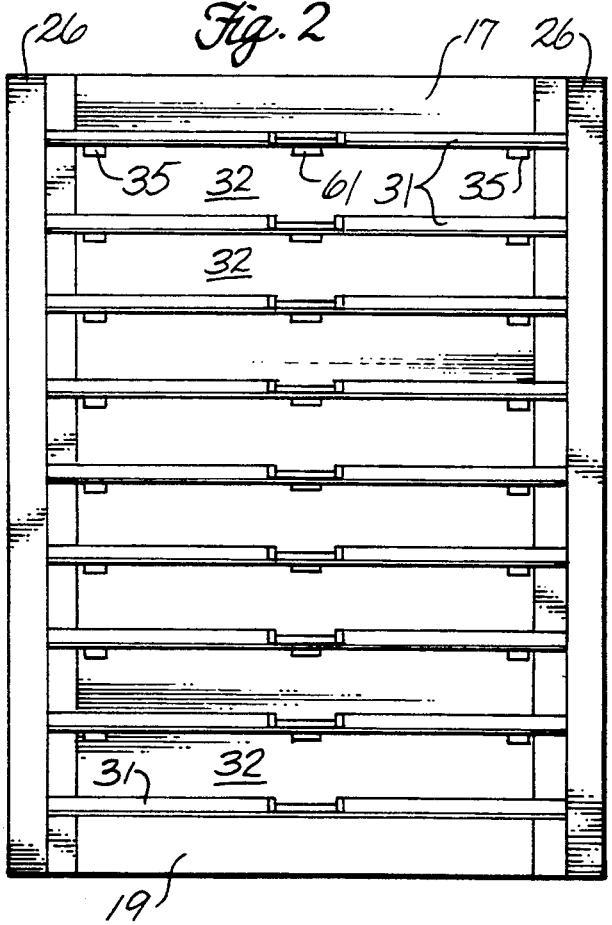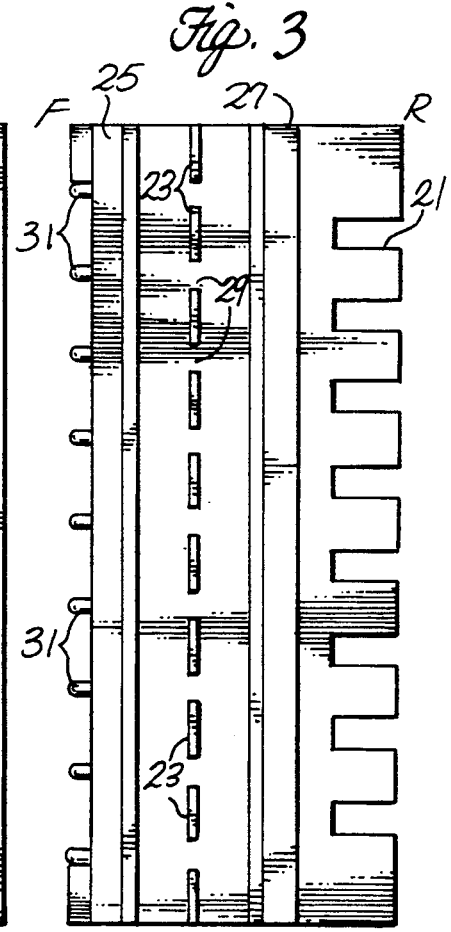

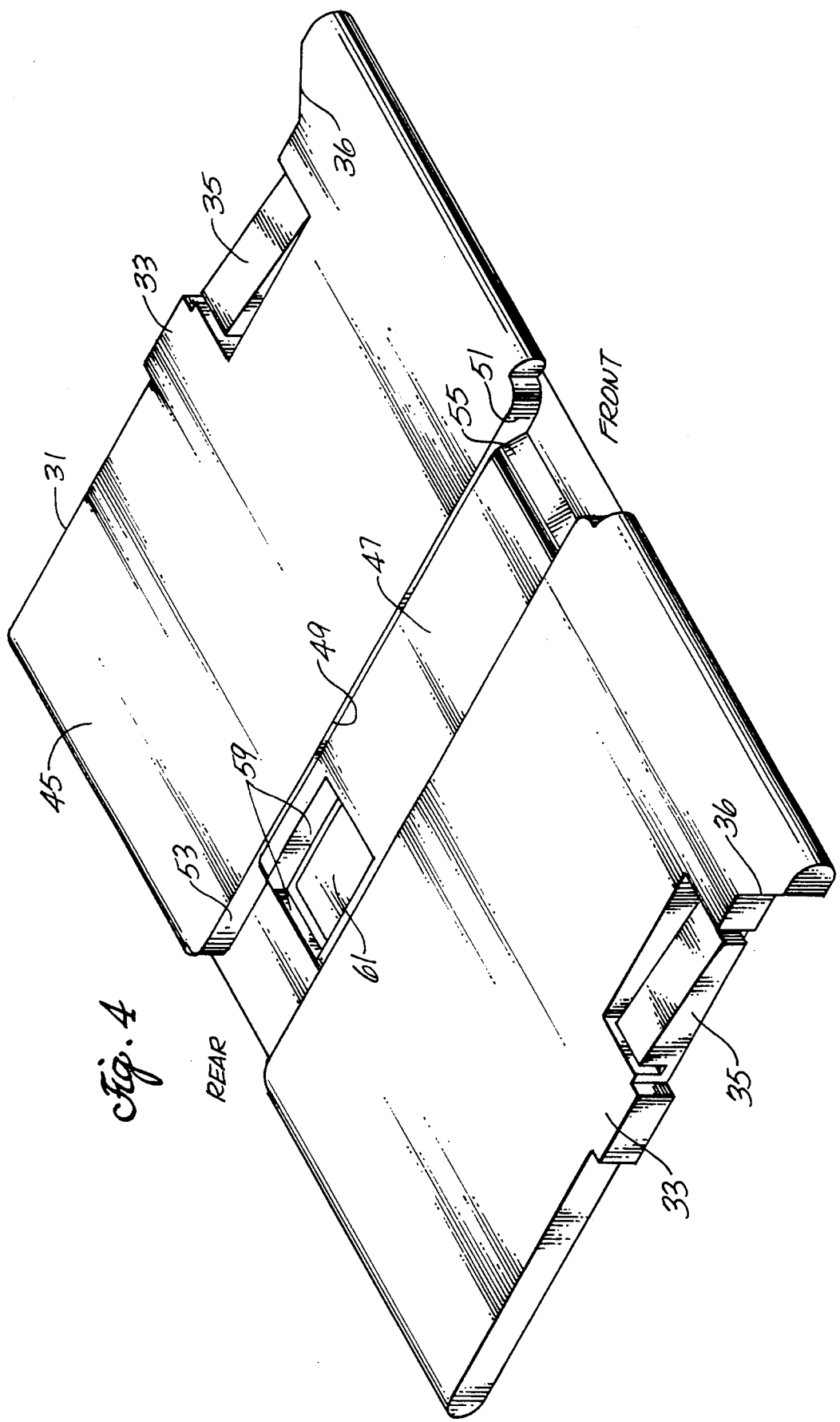

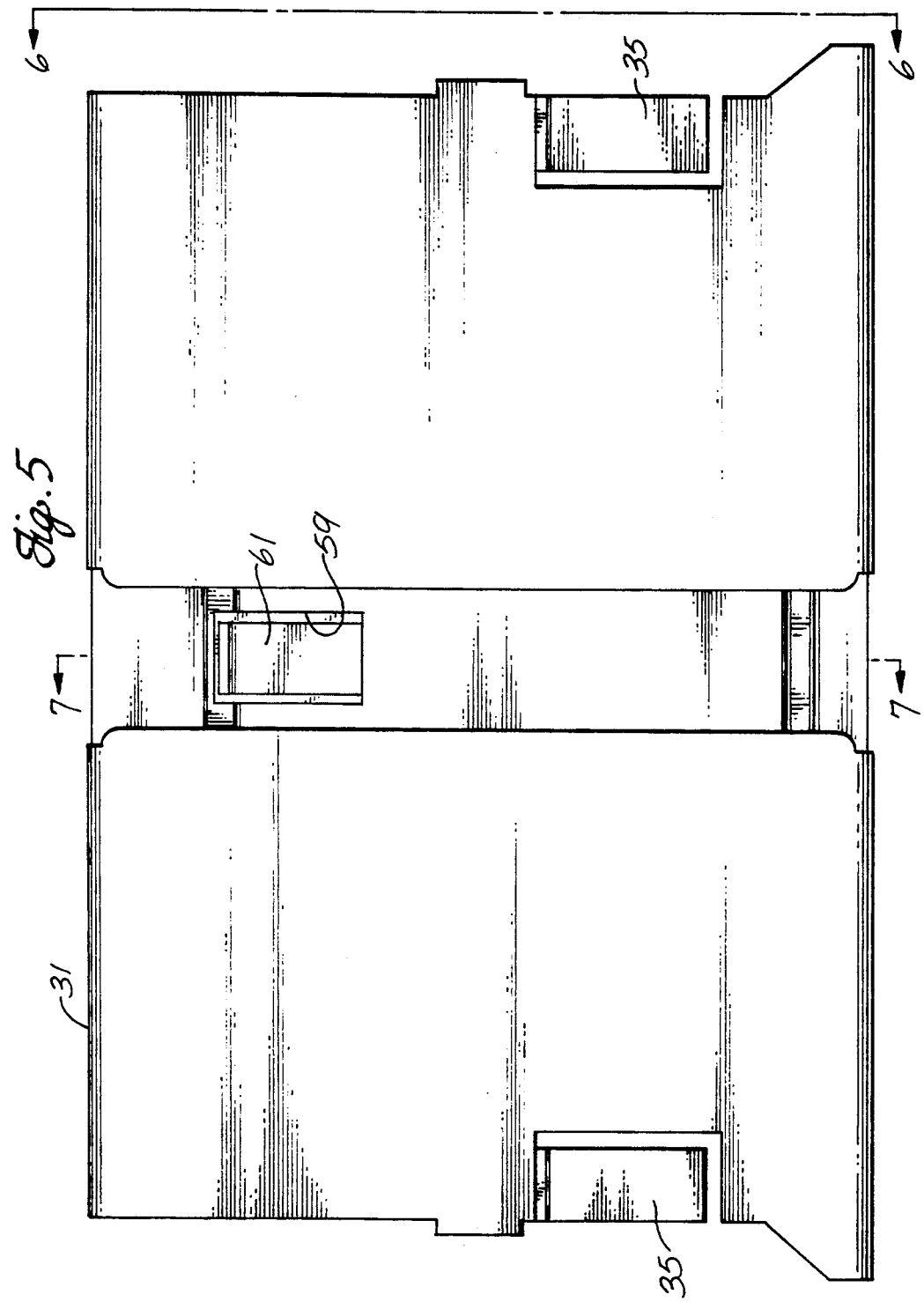

FRONT                                                                 REAR

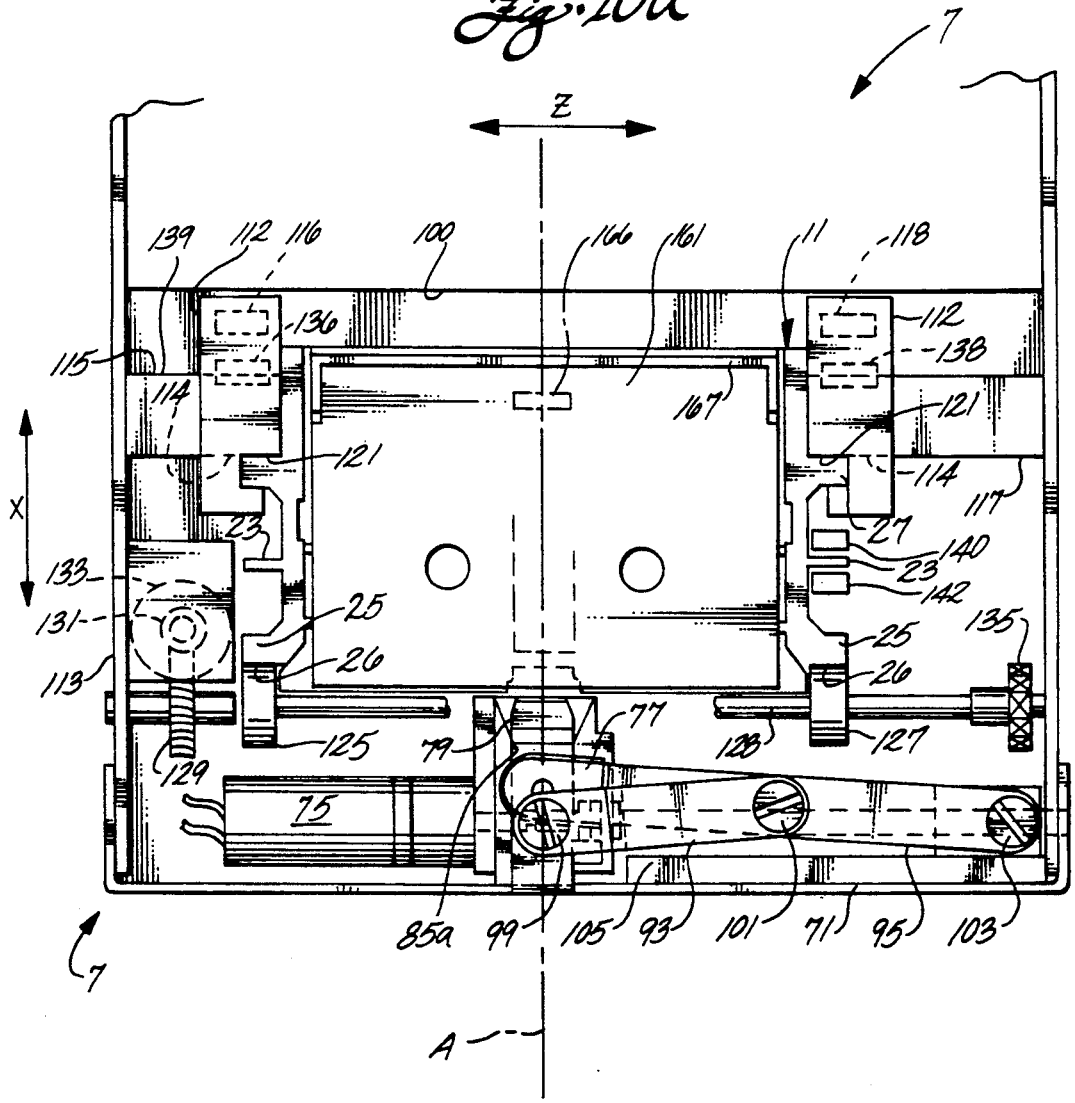

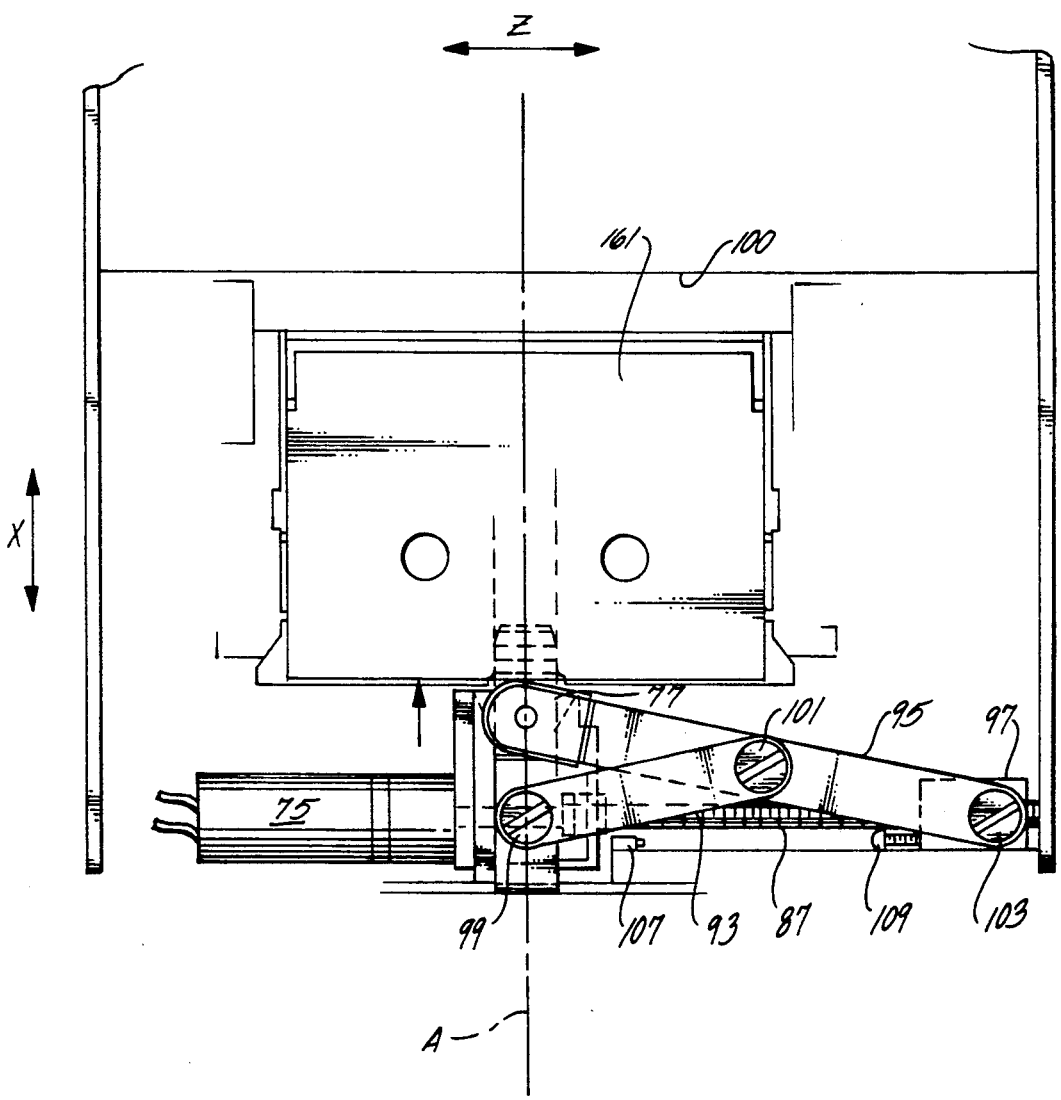

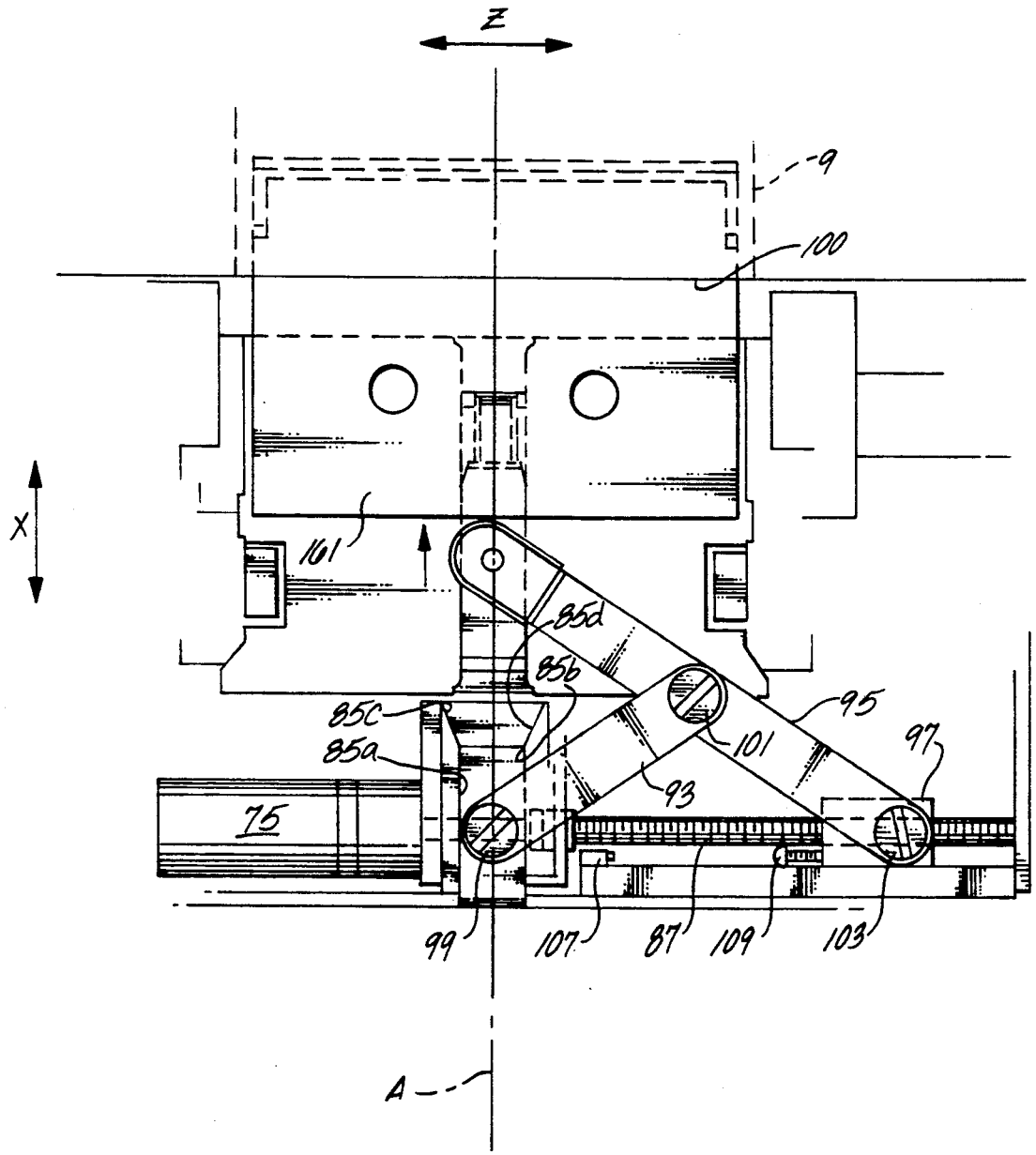

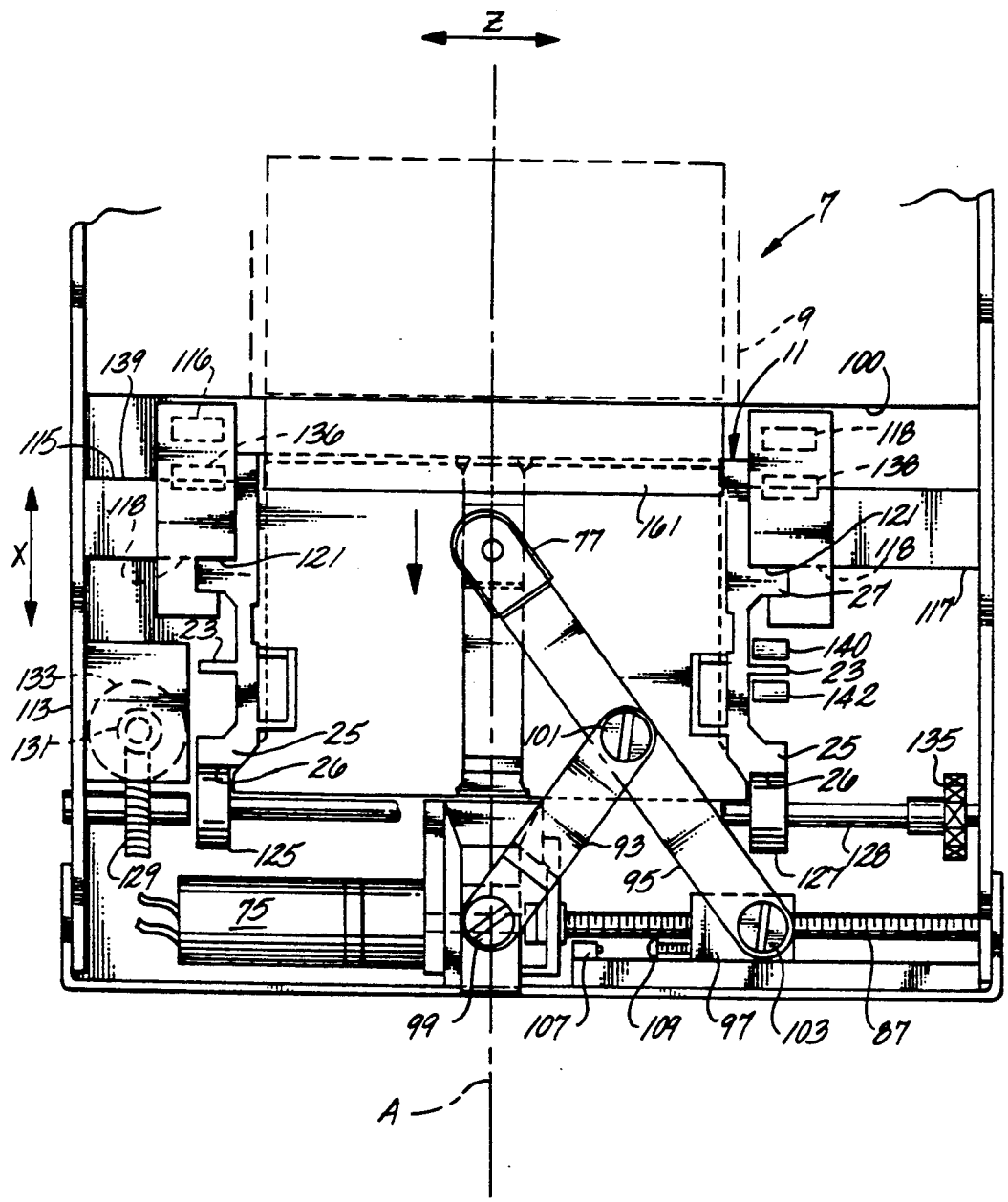

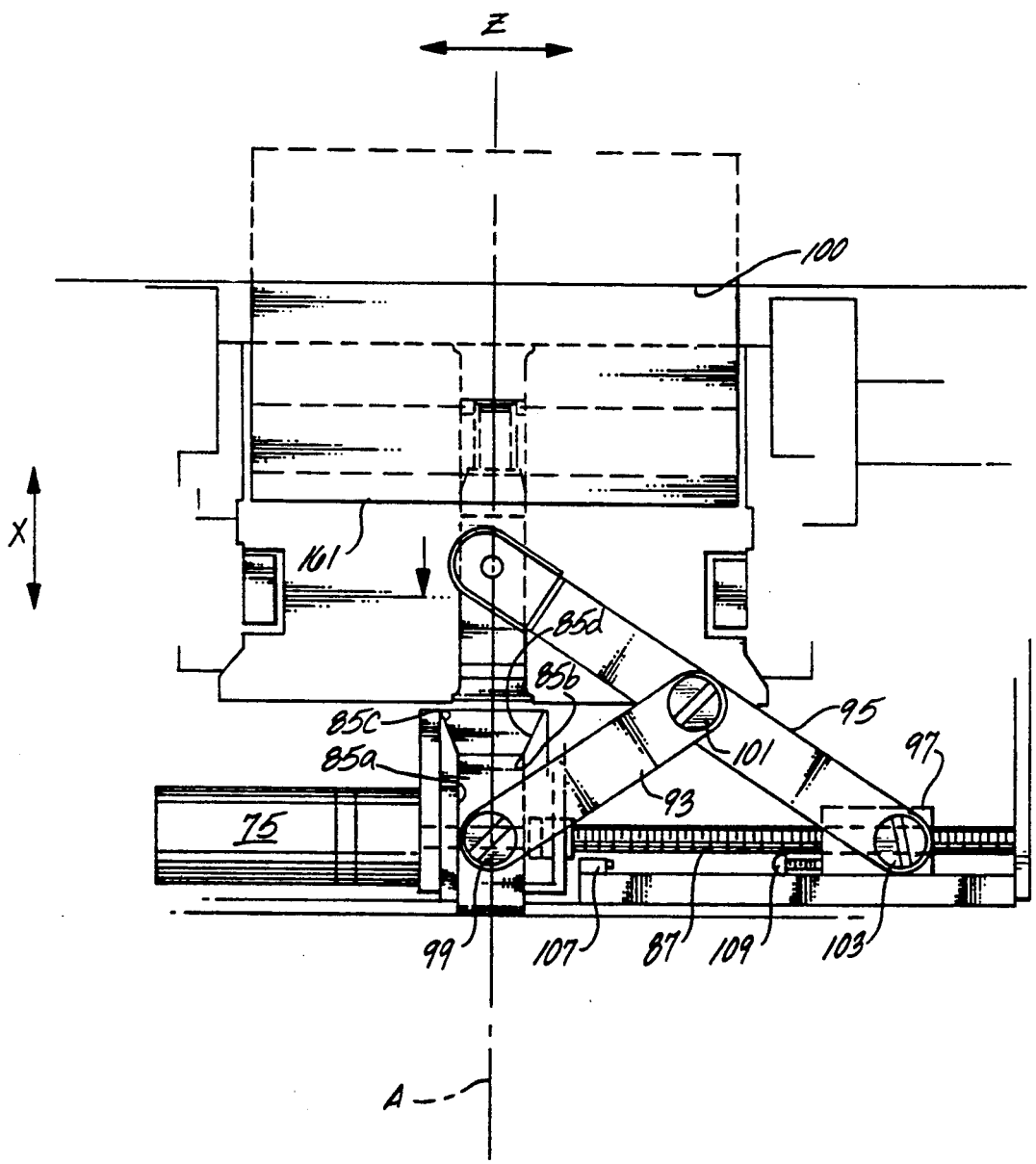

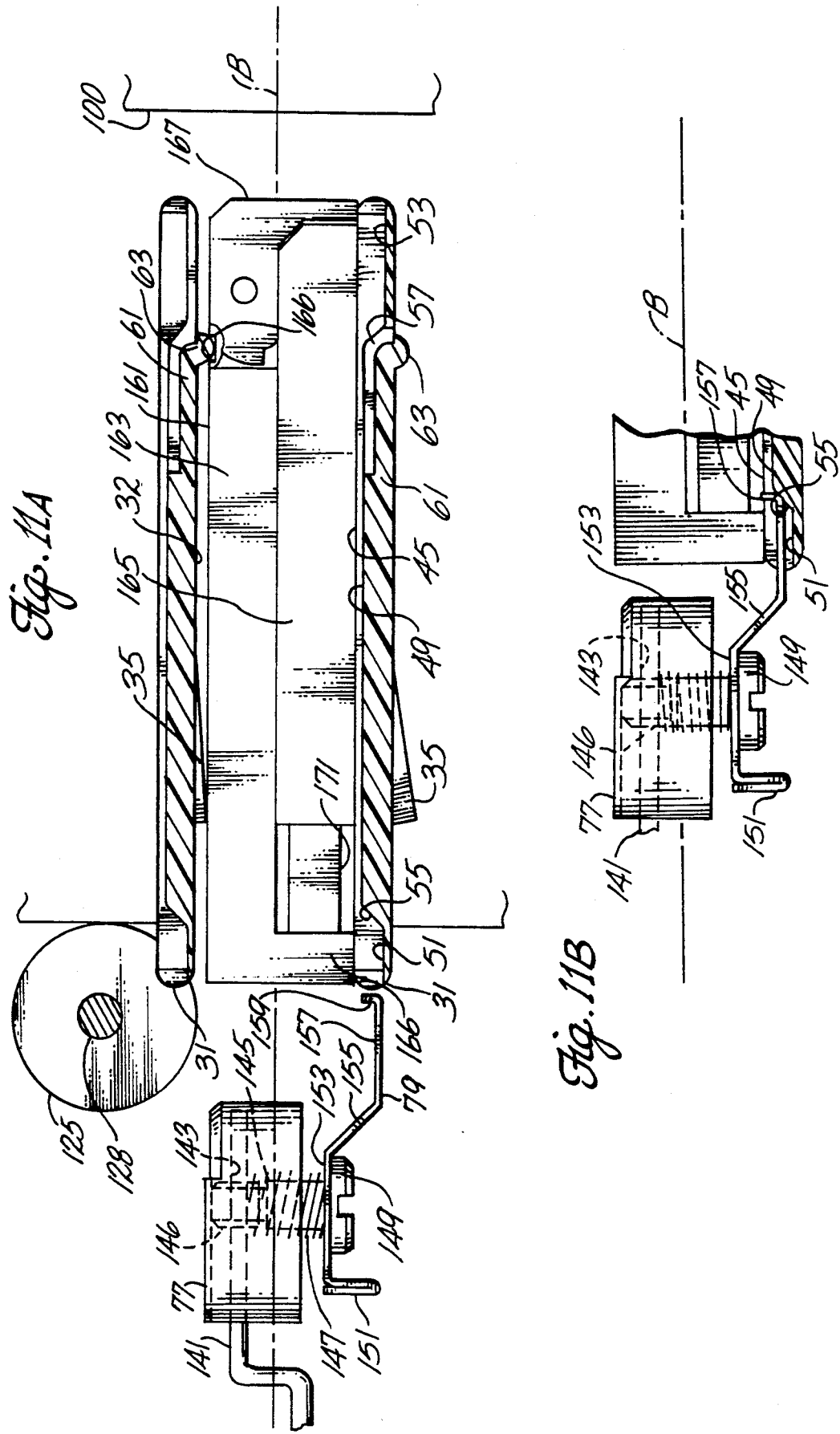

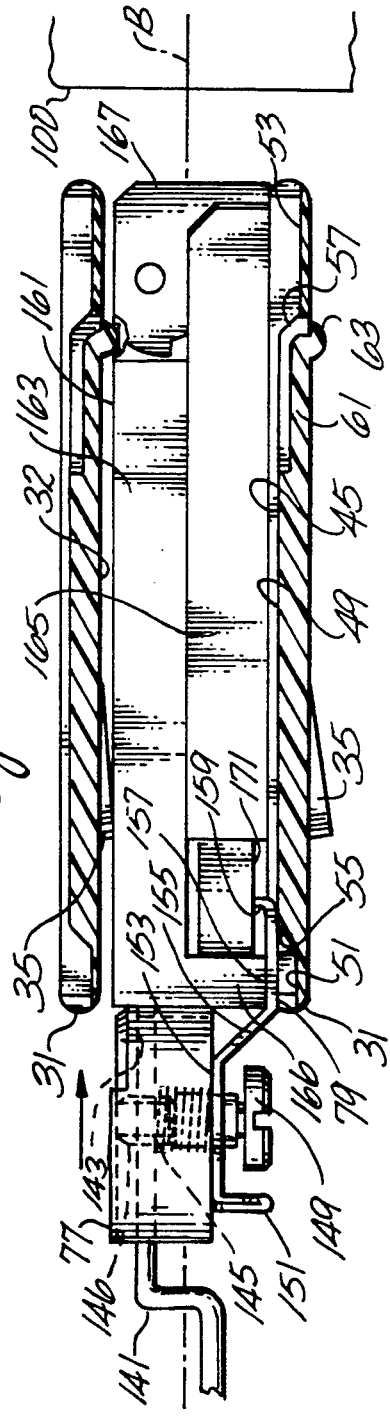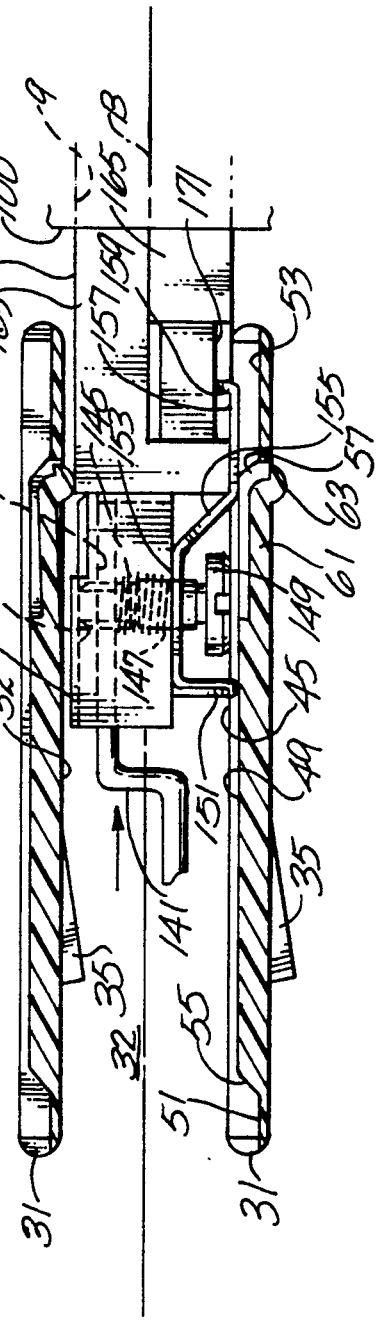

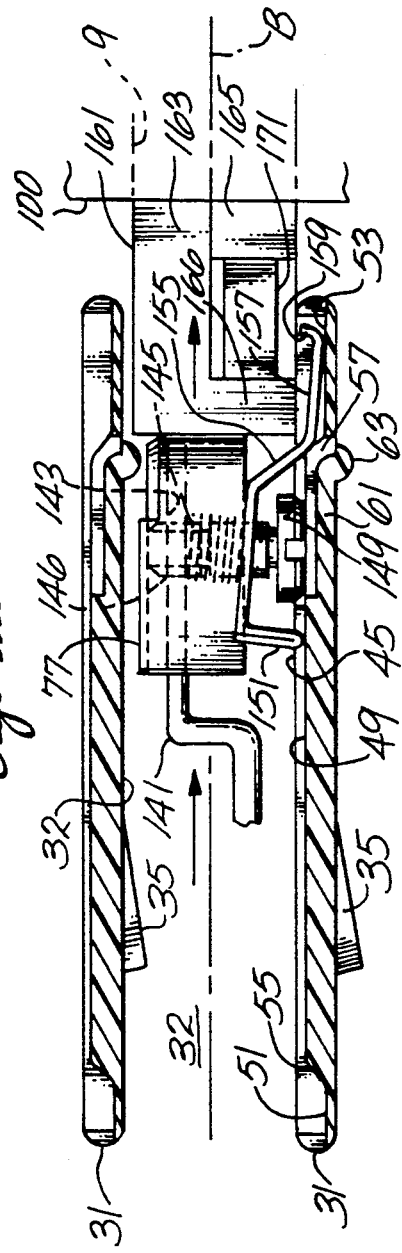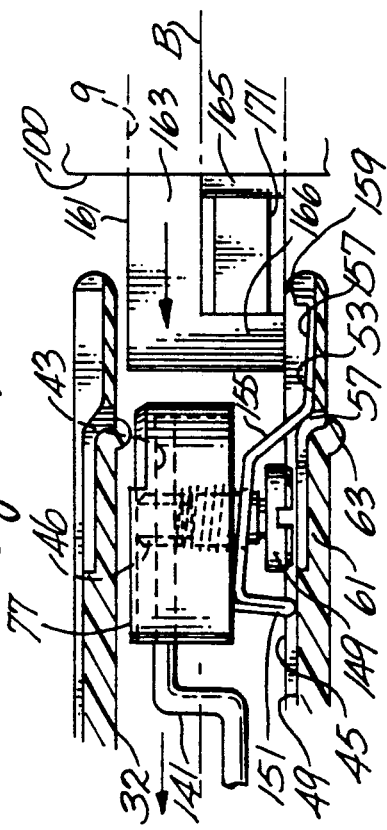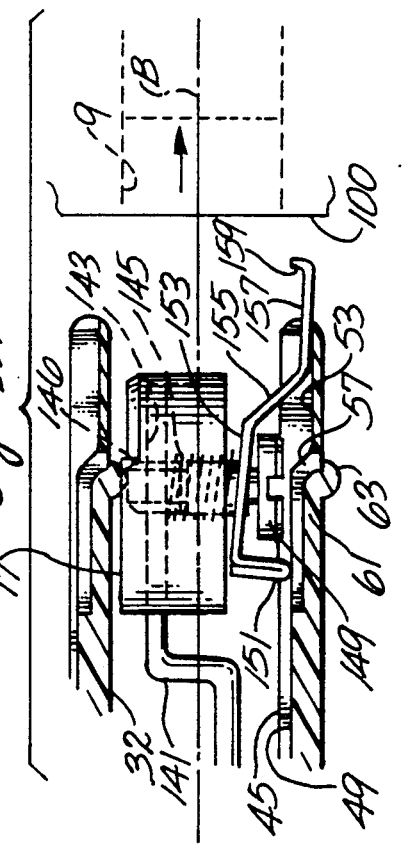

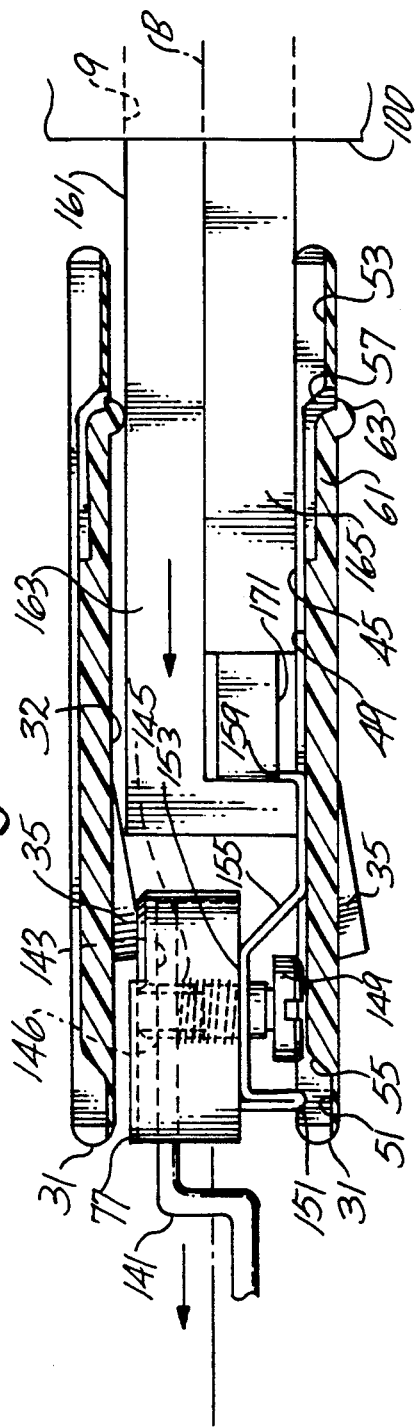
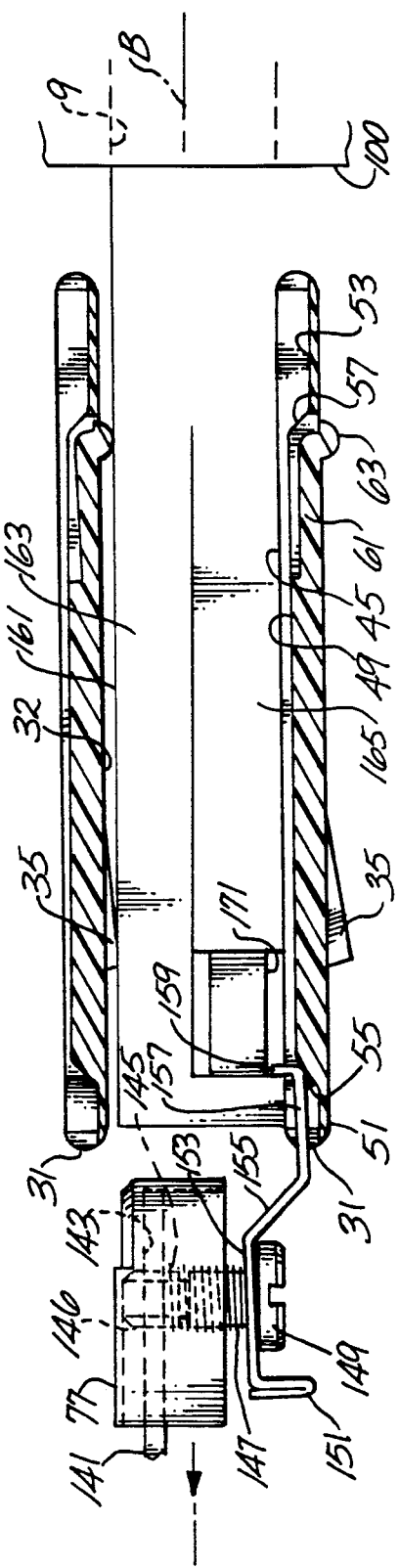

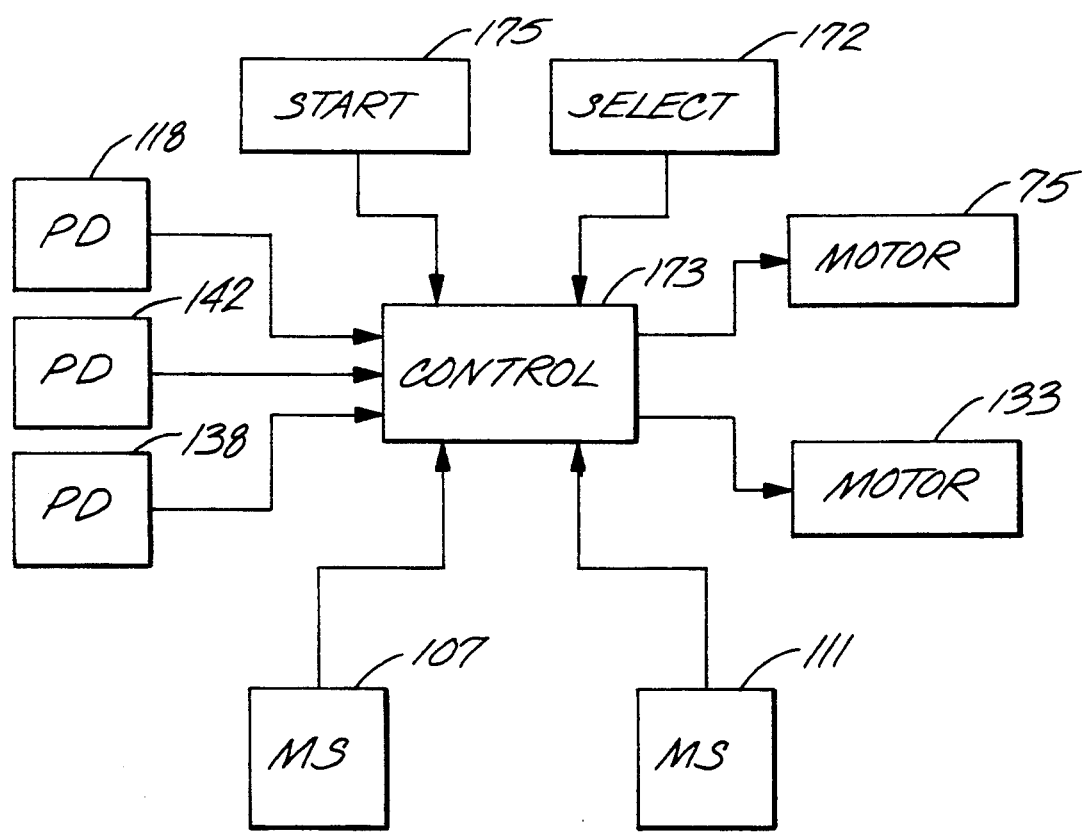

TAPE CASSETTE LOADING MECHANISM

BACKGROUND OF THE INVENTION

The present invention relates generally to tape cassette loading mechanisms, and particularly to a mechanism for loading cassettes into a tape drive from a multi-cassette magazine.

Magnetic tape may be used to store data, both as the primary storage means and as a backup to data normally stored on disk. Digital audio tape (DAT) cassettes originally developed for audio applications have been found useful for this purpose because of their small size and large storage capacity. Conventional DAT drives are adapted to receive a single DAT cassette at a time, either to play its contents or to record data thereon. Although DAT cassettes have a relatively sizable storage capacity, the amount of data which it is desired either to access or to back up continues to increase. It would clearly increase the usefulness of a DAT drive if it could be augmented with a cassette changer which would automatically load any one of a number of cassettes stacked in a single magazine. A group of such stacked DAT cassettes could provide an extremely large library of information or, where used as a backup, could multiply manifold the data that can be backed up by an unattended DAT drive. The present invention provides a loading mechanism capable of inserting DAT cassettes from a common magazine into a DAT drive and a magazine for holding DAT cassettes which is uniquely adapted for that purpose.

SUMMARY OF THE INVENTION

In accordance with the invention, use is made of an exterior recess along one of the walls of the typical DAT cassette in the process of loading and withdrawing the cassette from a tape cassette drive. The inventive loading mechanism includes a magazine having at least one, and typically a plurality of, chamber(s) for holding a tape cassette, the chamber(s) having front and rear openings. The magazine is positioned with a chamber opposite the tape drive inlet. Latching means, such as a latch, and a pushing means are held in a resting position outside of the chamber so positioned. The pushing means is adapted to force the cassette out of the chamber through its rear opening into the drive inlet, and the latch is adapted to hook into the exterior recess of the cassette held in the positioned chamber to pull a cassette ejected from the drive inlet back into the chamber. The pushing means and the latch are driven by means external to the magazine from their resting position outside of the positioned chamber, into that chamber through its front opening. Within the chamber, they are moved first toward and then away from the tape cassette drive, the pushing means being operative to move the cassette into the cassette drive from the positioned chamber, and the latch being operative to pull the cassette from the cassette drive into the positioned chamber through its rear opening.

In its preferred embodiment, the magazine chamber has a floor and a ceiling, one of which is faced by the recess in the cassette when the cassette is inserted in the chamber. A slot runs the length of the floor or the ceiling (whichever faces the cassette slot, but hereafter assumed to be the floor). The slot has ramps near its opposite ends. Preferably, the slot comprises a shallow central region and two deeper terminal regions at its opposite ends, next to the front and rear openings of the chamber. As the pushing means presses against the cassette in the positioned chamber, the latch enters the slot at its deep end in the front of the chamber with sufficient clearance to engage the recess in the cassette. Thereafter, the latch rides up on the front ramp onto the shallower central region of the chamber slot, where it enters the cassette recess.

When the cassette is about to be ejected from the chamber into the tape drive, the latch rides onto the ramp near the rear opening of the positioned chamber, allowing it to ride away from the cassette in the chamber so as to exit from the cassette recess, thereby allowing the cassette to be ejected from the positioned chamber. Subsequently, when the cassette is ejected from the tape drive back into the positioned chamber, the process is reversed by retracting the latch into that chamber, and, by the action of the ramps, the latch may be made to reenter and reengage the recess of the ejected cassette, pulling it back into the positioned chamber, after which the latch, by riding along the front ramp, may be disengaged from the cassette and withdrawn from the magazine.

In further keeping with the invention, the means for driving the pushing means includes a scissors mechanism, having an output arm driven at one end and carrying the pushing means at its opposite end into a cassette-holding chamber when the scissors mechanism is extended, and carrying the pushing means out of the chamber when the scissors mechanism is retracted. Because of the linkages which exist between the arms of the scissors mechanism, the pushing means carried by the free end of the mechanism's output arm is moved in a straight-line motion against the cassette in the holding chamber, preventing the cassette from being cocked to one side or another and thereby jamming in the magazine as it is being pushed. Both the output arm of the scissors mechanism and a link connected to the output arm are dimensioned to fit into a cassette-holding chamber in the magazine, yet occupy a minimum lateral space when fully retracted.

The latch by which the cassette is pulled from the cassette drive is biased away from engagement with the cassette recess so that it will move away from such engagement, except when pressed into engagement by being positioned between the cassette and the floor of the magazine chamber in which the cassette is held. Due to the action of the biasing means, the latch is forced out of engagement with the cassette when it enters and leaves the magazine chamber floor slot at its front and rear ramps. According to one variation of the invention, the latch is biased away from engagement with the cassette recess by being rockably mounted on the pushing means with a compression spring between the two, so as to cause the latch to ride along the front and rear ramps to engage and disengage the cassette recess. In accordance with another variation of the invention, biasing of the latch is accomplished by a constant-force spring, whose spiral configuration causes it to exert a force upon the latch away from the cassette and toward the floor of the magazine chamber containing the cassette. In the latter version, the constant-force spring also serves to help orient the latch in a direction parallel to its line of motion.

BRIEF DESCRIPTION OF THE DRAWINGS

These features and advantages of the invention, as well as other features and advantages of the invention, will be more apparent from a reading of the claims and of the detailed description of the invention in conjunction with the drawings described below.

FIG. 1 is a plan view of a magazine constructed in accordance with the present invention;

FIG. 2 is a front view of the magazine of FIG. 1;

FIG. 3 is a side view of the magazine of FIG. 1;

FIG. 4 is a perspective view of one of the shelves of the magazine of FIG. 1;

FIG. 5 is a plan view of the shelf illustrated in FIG. 4;

FIGS. 10A-10G are a series of plan views of the cassette loading mechanism, showing it in a time sequence from the time that a cassette is first engaged in a magazine, through the time when it is ejected from the magazine into a tape drive to the time when it is recaptured in the magazine from the tape drive and returned to its original position;

FIGS. 11A-11I are a series of cross-sectional views showing the mechanism illustrated in plan view in FIGS. 10A-10G through the same sequence, sometimes at slightly different moments in time;

FIG. 15 is a block schematic diagram of selected sensors which control movement of the magazine past the tape drive's inlet, and which also control the scissors mechanism in response to sensed positions of the scissors mechanism and sensed movements of a cassette.

DETAILED DESCRIPTION

Figure 6:
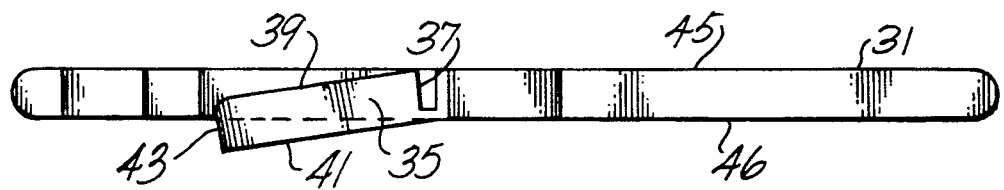
FIG. 6 is an end view of the shelf illustrated in FIG. 4.
Figure 7:
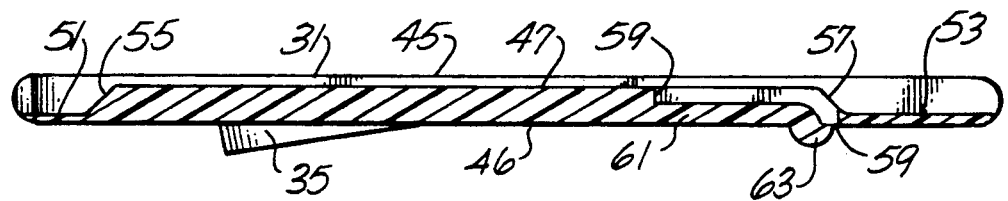
FIG. 7 is a cross-section through the shelf illustrated in FIG. 4, taken along lines 7—7 in FIG. 5.

A magazine constructed in accordance with the invention is illustrated in FIGS. 1-7. Constructed, preferably of high-strength injection-molded polycarbonate, with its shelves, which form spring tabs, possessing a high degree of elastic memory, the magazine 11 comprises a pair of side members 13 and 15 and top and bottom members 17 and 19, arranged in a rectangular configuration. The side members 13 and 15 have rearwardly-extending slots 21, with slots of one being aligned with corresponding slots in the other to permit photoelectric monitoring of cassettes within the magazine. Extending outwardly from both of the side members 13 and 15, in an L-shaped configuration, are front rails 25 having serrated tracks 26 on their front surfaces. Second rails 27 extend parallel to the front rails 25 toward the rear of the magazine 11 and, as will be seen, ride on a bearing surface of an elevator shaft. Extending between the front and rear rails 15 and 27 are a series of ribs 23 separated by spaces 29. The spaces 29 serve to provide a path for the light beam of an emitter/detector pair, located in the apparatus within which the magazine is transported, to keep track of the magazine's location therein. Stacked between the floor and ceiling members 17 and 19 are a series of identically-configured shelves 31, each pair of shelves defining a chamber 32 of the magazine 11. The shelves 31 are retained in the side members 13 and 15 by means of grooves therein (not shown).

As is best seen in FIGS. 4-7, each shelf has a generally-rectangular configuration and is of even thickness, except for variations that will be described. A pair of ears 33, extending from either side of the shelf 31, serve to key the shelf within the shelf-retaining grooves (not shown) in the side members 13 and 15. Also, for purposes of assembly, the front edge of the shelf extends outwardly on either side, as shown at 36, fitting against corresponding transitional surfaces 38 near the front of the side members 13 and 15.

Formed in either side of the shelf 31 and extending from the vicinity of the ears 33 are a pair of identical resilient tabs 35. Each of the tabs has a groove 37 near its fixed end, for greater resiliency, and a downwardly-extending projection 41 terminating in a face 43, which protrudes from the bottom planar surface 46 of the shelf 31. The tabs 35 serve to prevent incorrect insertion of cassettes into the magazine.

The top planar surface 45 of the shelf 31 is broken by a central slot 47 running front to back. The slot 47 has a shallow central region 49 and deep front and rear regions 51 and 53. Ramp 55 provides a gradual transition from the front deep region 51 to the shallow central region 49 of the slot 47, and a second ramp 57 provides a similar transition from the central slot region 49 to the rear deep slot region 53.

Cut through the center of the shallow central slot region 49 is a U-shaped channel 59, which terminates near the interface of the rear ramp 57 and the rear deep slot region 53. The portion of the shelf defined by the U-shaped channel 59 forms a cantilevered tongue 61 (see FIGS. 4, 5, and 7) having a bump 63 at its end which protrudes beyond the bottom planar surface 46 of the shelf 31. The tongue 61 serves as a resilient retention means for a cassette inserted in a chamber whose roof is formed by the shelf 31.

Figure 8:
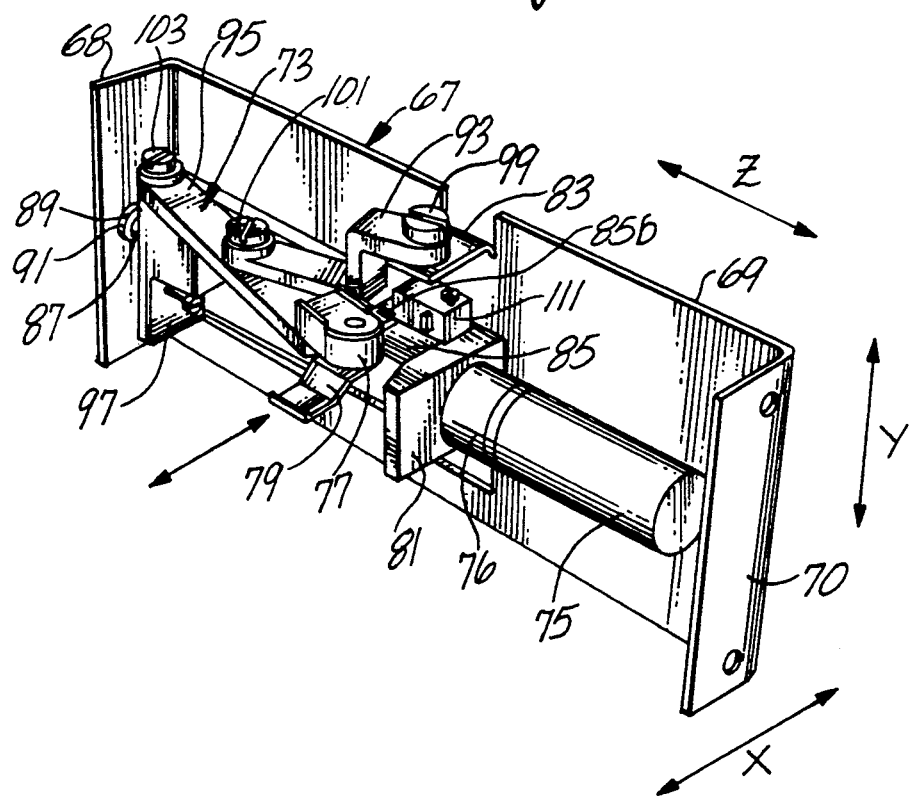
FIG. 8 is a perspective view of a subassembly of the cassette loader of the present invention, showing the cassette pushing and pulling devices mounted on a scissors mechanism.

A cassette loading-and-unloading apparatus 67 will be described with reference to FIG. 8, showing a subassembly containing a cassette pushing-and-pulling mechanism 8, and with reference to FIGS. 10A-10G, which show the cassette loading apparatus in plan view during successive steps of its operation, as well as with reference to FIGS. 11A-11I, showing the same mechanism in cross-section during successive steps of its operation. For sake of clarity, in FIGS. 10A-10G the magazine 11 is shown with its ceiling member 19 removed so as to reveal the successive locations of a cassette 161 in its top chamber 32.

Turning to FIG. 8 first, the cassette pushing-and-pulling assembly is mounted on a U-shaped bracket 67 having a central panel 69 and a pair of arms 68 and 70. The principal elements carried by the bracket 67 are a scissors assembly 73; a motor 75 for driving the scissors assembly; pushing means, in the form of a cap 77; and latching means, in the form of a latch 79. The cap and latch 77, 79 are carried by the scissors assembly 73 and serve as its pushing and pulling implements. The motor 75 may be a conventional micromotor, mounted on a bracket 81, which in turn is carried by a ledge 85 attached to the central panel 69. Coupled to the output shaft of the motor 75 through a microgear 76 is a lead screw 87, which is driven by the motor 75 through the microgear at a lower RPM than that of the motor 75.

The lead screw is anchored at its non-driven end by a collar 89 in a hole 91 in the bracket arm 68. Carried on the lead screw 87 is a lead screw nut 97, in the form of a block. Comprising the scissors mechanism are a pair of links 93 and 95. The link 93, having a stepped configuration, is rotatably mounted at its upper end (as seen in FIG. 8, wherein movements will be referred to with reference to the X, Y, and Z axes as illustrated thereon) by means of a screw 99 on a ledge 83. At its opposite, lower end, the link 93 is rotatably coupled to the long arm 95, at its midpoint, by a screw 101. The scissors' long arm 95 is pivotably mounted at one of its ends for rotation about the lead screw nut 97 by a screw 103 rotatably fastening the arm 95 to the lead screw nut 97.

The lead screw nut 97 rides, in the Z direction, upon a rail 105 mounted on the bracket panel 69 (see FIG. 10A). The nut 97 is driven by the lead screw 87, which extends through it, so that the scissors mechanism 73 may be extended and retracted under the force of the motor 75 transmitted through the lead screw 87, and its nut 97 to the long scissors arm 95 attached to the nut. Significantly, the free end of the long arm 95 moves in a straight line in the X direction.

When the scissors mechanism 73 is fully retracted, the latch 79 rides onto the ledge 85. As seen in FIG. 11A, the cap 77 is mounted on a bent finger 141, which extends from the long scissors arm 95. A slot 143 in the cap 77 receives the finger 141. A hole 145 in the cap, threaded at its end and countersunk at its inlet, receives a threaded bolt 149, which extends through a hole 146 in the finger 141 in alignment with the hole 145 in the cap 77. The latch 79 is rockably mounted relative to the long scissors arm 95 by placing it between the head of the bolt 149 and a compression spring 147, and then screwing the bolt 149 into the cap 77 so that the compression spring 147 is received by the countersunk inlet of the ca hole 145. The cap is thus securely and firmly mounted on the finger 141, while the latch 79 is free both to rock and to rotate relative to the cap 77 from which it is biased away by the compression spring 147.

Mounted above the ledge 85 (FIG. 8) is a microswitch 111, whose purpose it is to sense when the scissors mechanism 73 has been fully retracted. In that position, shown in FIG. 10A, the tail 151 of the latch 79 (shown in FIG. 11A) is pressed against the microswitch 111 so as to actuate it. A similar microswitch 107, visible in FIG. 10B, mounted below the ledge 85 and facing toward the nut 97, serves to sense the fully-extended condition of the scissors mechanism 73. For that purpose, the nut 97 carries a screw 109 in line with the microswitch 107, which may be adjusted so that the motor 75 may be stopped when the long arm 95 has reached a previously determined, precise position along its travel in the X direction, toward the DAT drive inlet.

Beginning with FIG. 10A, there will be described the remainder of the loading and unloading apparatus 7, for loading a tape cassette into the inlet 9 of a DAT drive. The apparatus 7 is contained within a frame 113, to which the bracket 67 of the push/pull mechanism is attached. The frame 113 is, in turn, attached to the front of a DAT tape drive, whose front surface 100 is closely spaced from the rear of the apparatus 7. Extending upright, near the rear, are a pair of elevator posts 115 and 117, capped by guide blocks 112. Between them, the posts 115, 117 define part of an elevator shaft, within which the magazine 11 is raised and lowered. The guide posts 115, 117 have flat bearing surfaces 114, on which the magazine rear rails 27 ride in the Y direction. The guide blocks 112 have slots 121, slightly V-shaped in the Y direction, to guide the magazine rails 27 into position.

Figure 9:
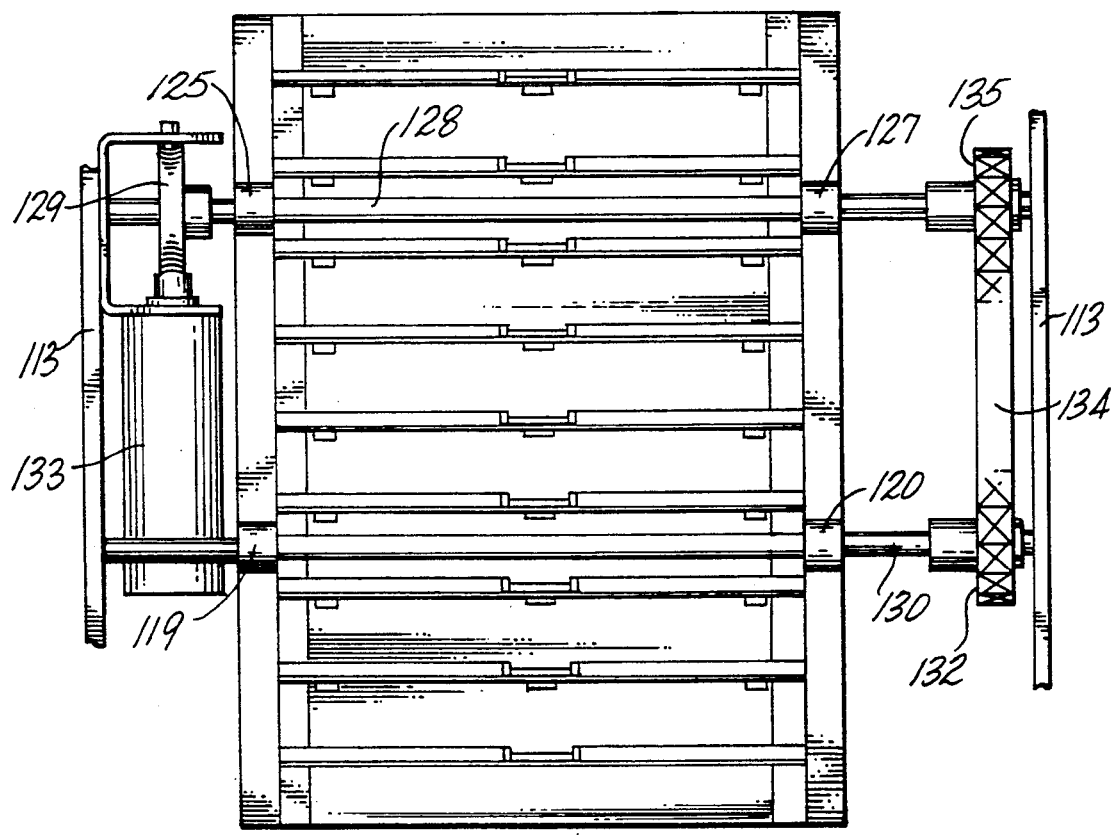
FIG. 9 is a view in front elevation of the cassette loading mechanism.

Spaced from the posts 115, 117, a pair of rubber drive rollers 125 and 127 are mounted on a powered shaft 128. The powered shaft 128 is journaled in the frame 113 for rotation and carries a driven gear 129 and a driving sprocket 135. The driven gear 129, in turn, is engaged to be driven by a gear 131, which is mounted for rotation about the Y axis and which, in turn, is driven by a micromotor 133. A second pair of rubber rollers 119 and 120 (FIG. 9) are carried by a second, driven, shaft 130. A driven sprocket 132, coupled to the driving sprocket 135 by a drive belt 134, completes the power train to the lower pair of rollers 119, 120, so that the magazine 11 is driven by all four rollers 119, 120, 125, and 127, powered by the motor 133. Under the control of an emitter/detector pair 140, 142, located on either side of the series of ribs 23 which extend from the side of the magazine 11, motor 133 is made to position a selected one of the chambers 32 opposite the DAT drive inlet 9.

As the magazine 11 is pushed down into place, its front tracks 26 press first against the upper drive rollers 125, 127 and then against the lower drive rollers 119, 120. The rollers 125, 127, 119, and 120, in turn, press the magazine rear rails 27 against the bearing surfaces 118 of the posts 115, 117. Mounted next to the post 117 is one element 118 of a photoemitter/detector pair, and mounted next to the other post 115 is another element 116 of the pair, to permit sensing of the ejection of a cassette from the DAT drive into the magazine chamber 32, which is then in line with the DAT drive inlet 9. A second emitter/detector pair 136, 138 is positioned at the same elevation (along the Y axis) as the pair 116, 118, but farther from the DAT drive face 100. They serve to detect when the pusher cap 77 is in its forward, parked position, signalled by the breaking of a light link between the pair 136, 138 through a pair of the magazine rear slots 21. The magazine 11 is shown with the top one of its chambers 32 aligned with the DAT drive inlet 9, in FIGS. 10A-10E and in FIG. 11D. The same position is illustrated in FIGS. 11A-11I, but, for simplicity, the DAT drive inlet 9 does not appear in all of them. Suffice it to say that a common plane B—B (FIG. 11A) extends through the scissors mechanism 73, the DAT drive inlet 9, and the chamber 32 positioned between them. A significant advantage of the magazine 11 is that it is easily lifted out of its elevator and replaced by another magazine.

Referring particularly to FIG. 11A, a DAT cassette 161 is shown fully recessed in the chamber 32 of the magazine 11. The cassette 161 comprises a body 163, on which is mounted a sliding cover 165. A small detent 166 in the top of the cassette body 163 receives the enlarged end 63 of the retaining tongue 61 which depends from the shelf 31 forming the roof of the chamber 32. Mounted on the rear of the cassette body 163 is a hinged tape cover 167. The DAT cassette which is illustrated is a standard product whose cover 165 is spaced from a lip 166 at the front of the cassette, to form a recess 171. When the DAT cassette is inserted into a DAT drive, the sliding cover 165 slides toward the front of the cassette into the clearance formed by the recess 171, bringing a pair of windows (not shown) into alignment with the hubs of the supply and take-up reels inside the cassette. At the same time, the hinged cover 167 swings up, exposing the tape to magnetic read/write heads. In its closed condition, where the covers 165 and 167 are as shown, the cassette is a fully enclosed and protected package and provides the recess 171 upon which, in its preferred embodiment, the present invention relies to enable the cassette to be withdrawn from the DAT drive in a manner to be described next.

As shown in FIG. 11A, the latch 79 is formed, in its preferred embodiment, in the shape of a hook having a tail 151, an anchor 153, an intermediate sloping section 155, a slide portion 157, and a tip 159. The cap 77 and latch 79 are shown immediately adjacent the front of the magazine 11, where they are positioned by the fully retracted scissors mechanism 73. The latch 79 rests on the ledge 85, in which it is aligned to be in line with the central slot 47 of the shelf 31. For this purpose, the ledge 85 is provided with upright (in the X-Y plane, as viewed in FIG. 8) walls 85a and 85b, which flare outwardly at 85c and 85d to receive, and then orient, the latch 79 on the ledge 85.

When it is desired to insert the cassette residing in the chamber 32 opposite the DAT drive inlet 9, a signal is sent to the motor 75, causing the scissors mechanism to begin to move toward its extended position. The latch 79 enters the chamber 32, its tip 159 clearing the space between the bottom of the DAT cassette 161 and the front deep slot portion 51. As the scissors mechanism continues to progress, the latch tip 159 rides up the front ramp 55 into the space between the bottom shelf 31 and the cassette 161 provided by the cassette recess 171. It will be noted that the height of the latch tip 159 must not exceed the depth of the shelf slot front region 51 and that the ramp 55 must be far enough away from the front end of the shelf 31 to permit the latch tip 159 to clear the cassette front lip 166.

In FIG. 11C, the cap 77 is shown to have engaged the cassette 161, which begins to be pushed by the cap toward the rear of the magazine chamber 32 and into the DAT drive inlet 9. The latch tip 159 is inside the cassette recess 171, and the latch slide portion 157 has entered the shallow central portion 49 of the shelf slot 47. Due to the proximity of the ledge 55 to the magazine shelf 31, the latch slide portion 157 transits from the ledge 85 to the shelf slot 47 without losing its orientation acquired in the ledge. The width of the latch slide 157 is matched to fit closely within the slot region 49 so as to keep the latch 79 aligned within the slot 47. The thickness of the latch slide 157 is matched to the depth of the slot shallow portion 49 so as to be fully recessed therein, or at least sufficiently so as not to interfere with the movement of the cassette 161. The height of the latch tip 159 ensures that, being sandwiched between the cassette 161 and the shelf slot shallow portion 49, the latch 79 will firmly engage the cassette, and particularly its front lip 166, when the latch is subsequently retracted.

Movement of the cap 77 and latch 79 toward the rear of the magazine 11 continues, with two successive positions of the cassette being illustrated in plan view in FIGS. 10B and 10C.

The next notable event is depicted in FIG. 11D, when the latch is about to descend the rear ramp 57. Shortly thereafter, as shown in FIG. 11E, the bend in the latch joining its portions 155 and 157 reaches the ramp 57 and begins to ride down the ramp, which results in the latch rocking about its mounting bolt 149. The latch slide portion 157 is nearly fully on the rear terminal portion 53 of the slot 47, and the tip 159 of the latch has moved out of the way of the cassette lip 166. This prepares the way for the next event, shown in FIG. 11F, where the cassette 161 has traveled far enough into the DAT drive inlet 9 to cause the DAT drive to grab the cassette and move it out of the magazine 11. The latch 79 has, by this time, moved beyond the rear of the shelf 31 and protrudes slightly from the magazine 11. This fully-extended position of the scissors mechanism 73 is sensed by the microswitch 107, in response to which, by appropriate electronic controls, shown and later described with reference to FIG. 15, the motor 75 is reversed, causing the scissors drive 73 to begin to retract, pulling the latch 79 back into the magazine 11 to assume the position shown in FIG. 11G, where it is parked until the cassette 161 is ejected from the DAT drive inlet 9. The "parked" position of the latch 79 is sensed by reestablishment of the previously broken light path between the emitter/detector pair 136, 138 by the pusher cap 77, causing the motor 75 to stop with the latch in that (parked) position.

Figure 10D:
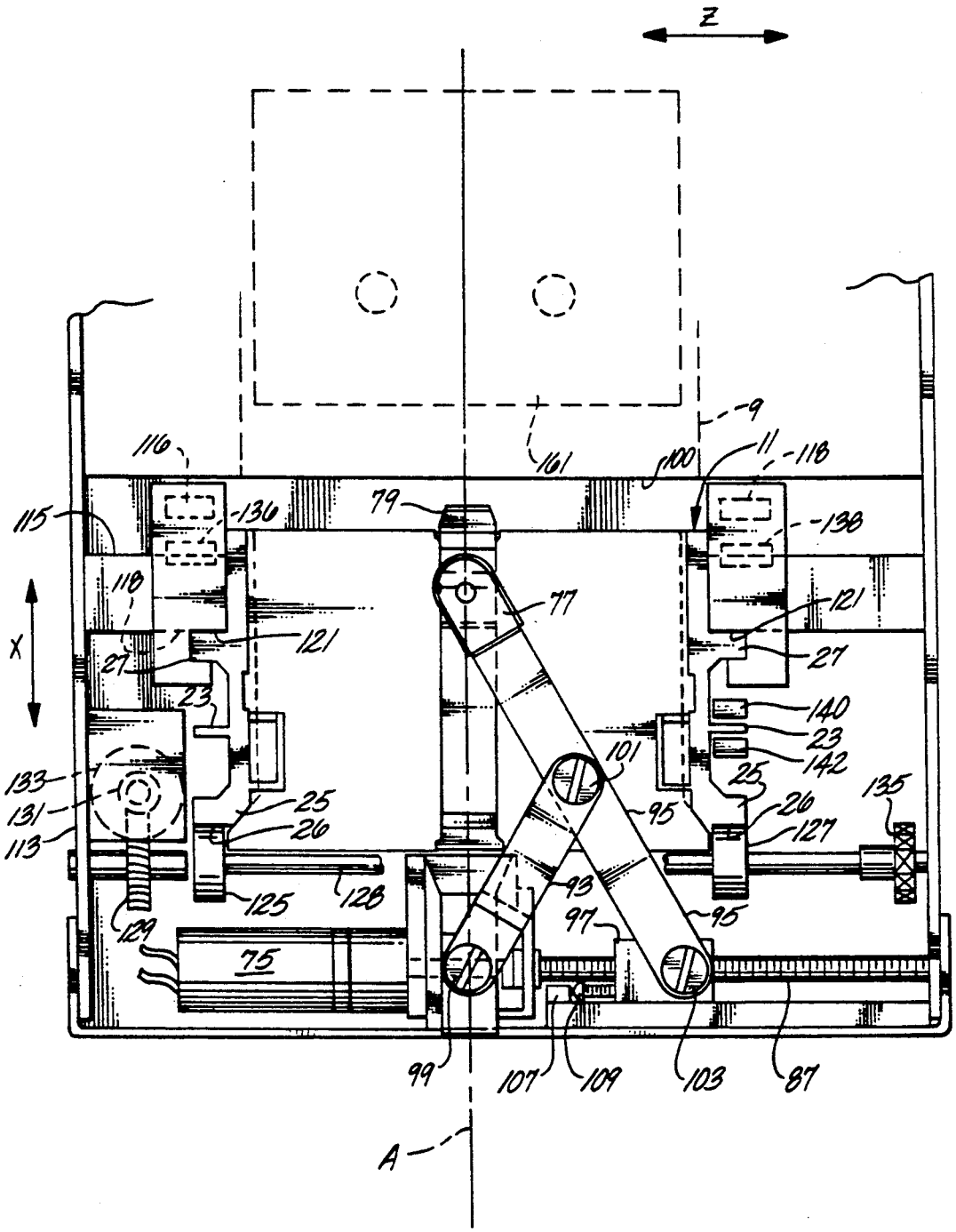
Figure 10G:
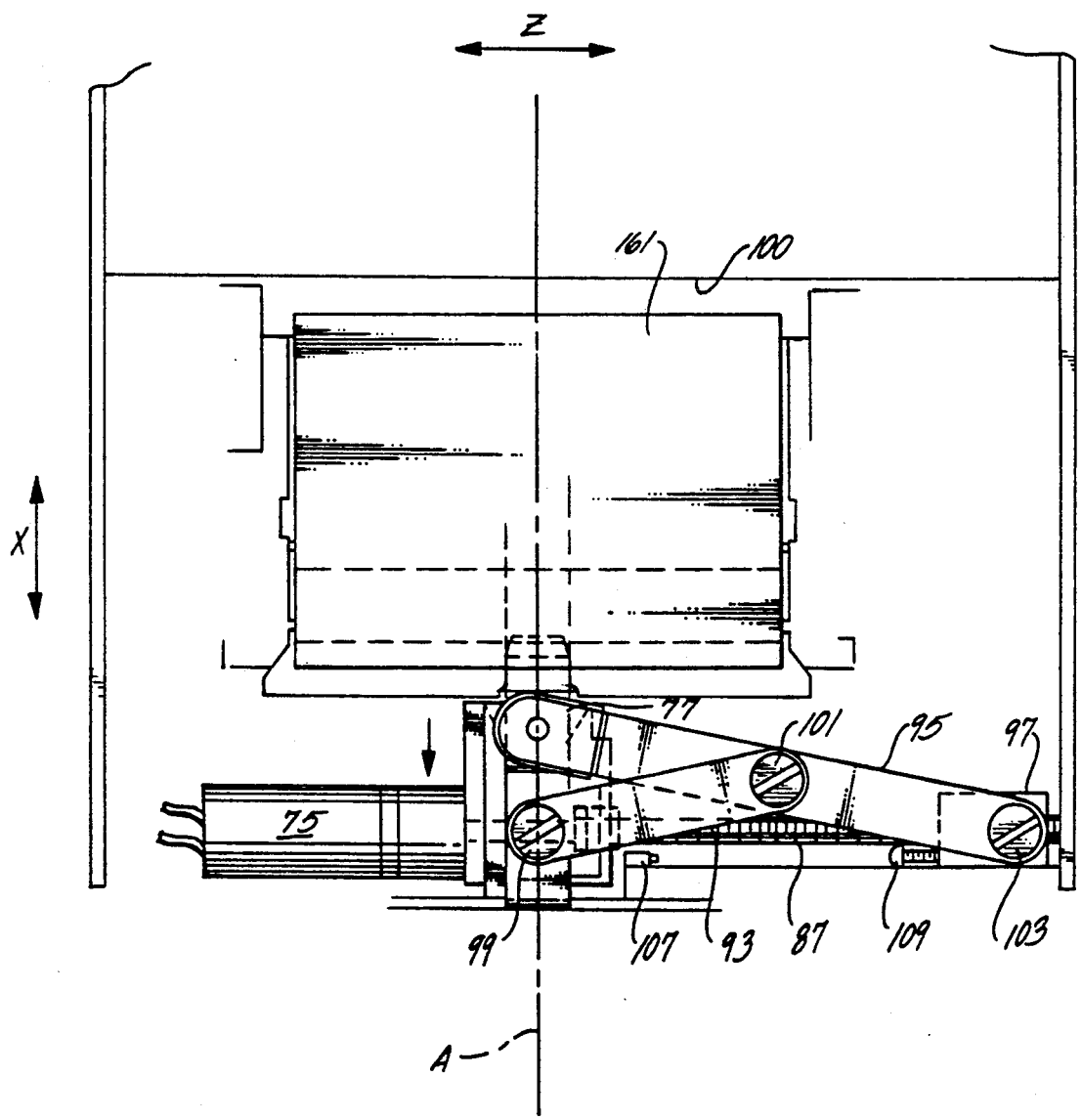

The cassette 161 is shown in FIG. 11G as being ejected from the DAT drive into the magazine chamber 32. When the front end of the cassette 161 crosses the gap between the DAT drive face 100 and the magazine 11, the second emitter/detector pair 116, 118 senses the presence of the cassette 161 and, through the same electronic controls as are associated with emitter/detector pair 136, 138 restarts the motor 75. This causes the latch 79 to remount the rear ramp 57 and to pivot about the tip of its tail 151, whereby the latch tip 159 enters the cassette recess 171, engages its front lip 166, and pulls the cassette with the receding arm 95 of the cassette mechanism. In this manner, the cassette 161 continues to be withdrawn from the DAT drive until the latch tip 159 again reaches the front ramp 55, whereupon the latch 79 slides away from the cassette 161, out through the gap between the cassette lip 166 and the shelf ramp 55, and onto the ledge 85, where it is parked. This marks the full retraction of the scissors mechanism 73, sensed by the microswitch 111. In response thereto, through the action of the aforementioned electronic control, the motor 75 is stopped. The positions of the mechanism depicted in FIGS. 11F and 11G are respectively illustrated in plan view in FIGS. 10D and 10E. FIG. 10G shows in plan view the position corresponding to that illustrated in cross-section in FIG. 11I. FIG. 10F illustrates the mechanism at an intermediate point between the positions depicted in FIGS. 11G and 11H.

It will be understood that, as used herein, "floor" is an arbitrary designation used in the context of equipment that is upright, as shown. Therefore, regardless of the orientation, the term "floor" as used herein shall be understood to designate the shelf 31 toward which the cassette slot 171 faces, and that the latch 79 always travels between the cassette 161 and the shelf faced by its slot 171.

Certain geometric relationships among the locations of the DAT drive inlet 9, the chamber 32 which is positioned next to it, the cap 77, the scissors arm 95, the link 93, and its pivot point defined by the center of the screw 99, are worth noting. The chamber 32 is rectangular in cross-section and is symmetrical about a center plane A (FIG. 10A), which lies in the X-Y plane. The pivot point about which the link 93 is anchored by the screw 99 to pivot, lies in the plane A adjacent the front opening of the chamber 32. A second plane B (FIG. 11A), which is orthogonal to the first plane A and which extends along the X and Z axes (FIG. 8), extends through the DAT drive inlet 9 and through the chamber 32 positioned opposite the inlet. It is along the intersection of the A and B planes that the cap 77 is pushed by the output arm 95 through the positioned chamber 32 toward, and away from, the DAT drive inlet 9. It is because of this straight-line motion of the means which contacts the cassette 161 (in this case, the front end of the cap 77) that the cassette 161 may be pushed without cocking it to one side or another, which might cause it to bind in the magazine chamber 32.

It will be seen from the foregoing that the slot 47, by virtue of its configuration, functions as a camming surface, and that the tail and slide portions 157 of the latch 79 function as cam followers, which are guided by the surfaces of the cam to move the latching tip 159 into engagement with the cassette recess 171, and, under the urging of the biasing means 147, which normally urges the latching means away from engagement of its latching tip 159 with the cassette recess 171, to guide the latching tip 159 out of engagement with the cassette recess 171.

Operation of the system may be best summarized with reference to FIG. 15, showing the control 173 connected to the motor 75 and receiving inputs from the detectors 118, 138 and 142 and from microswitches 107 and 111. In response to a "select" signal 172 to the control 173, indicating which chamber 32 is to be positioned opposite the DAT drive inlet 9, the motor 133 drives the magazine 11 until the magazine is sensed, by means of the emitter/detector pair 140, 142, to be in the proper positions relative to the DAT drive inlet 9. In response to a "start" signal 175, the control 173 activates the motor 75, causing the scissors mechanism 73 to begin to advance. After the cassette 163 has been grabbed by the DAT drive out of the magazine 11, the scissors mechanism 73 continues to advance until its fully-extended position is sensed by the microswitch 107. The control 173 is programmed to reverse the motor 75, withdrawing the long arm 95 until the latch 79 is sensed by the emitter/detector pair 136, 138, which senses interruption of light between the pair by the presence of the cap 77. This represents the "wait" position of the cap and latch 77, 79, as shown in FIG. 11G. When the cassette 161 is ejected from the DAT drive inlet 9, the event is sensed by the emitter/detector pair 116, 118, which cause the control 173 to reactivate the motor 75, initiating the retraction of the long arm 95 and with it, the cassette 161, until the scissors mechanism is fully retracted, as sensed by the microswitch 111, which, through control 173, stops the scissors drive motor 133.

FIGS. 12A-12E, 13, and 14 illustrate an alternative embodiment of the invention which may be similar to the embodiment illustrated in FIGS. 10 and 11, with the principal difference being that the latch is differently configured and is supported at the end of a constant-force spring 201. In the alternative embodiment illustrated in FIGS. 12A-12E and in FIGS. 13 and 14, a constant-force spring 201 is mounted next to and below the ledge 85. Welded to the end of the spring 201 is a latch 207, which may be made of spring steel. In this embodiment, the latch may be more simply configured, 207a extending at right angles from the body 207a.

A post 203 is pinned to the spring and latch 201/207 so that the three elements (spring/post/latch 201/203/207) are rigidly attached, with the post 203 at substantially right angles to the hook 207. Of course, due to the flexibility of the spring 201, the hook 207 is movable between the two positions shown in FIGS. 12 and 13 respectively. In this respect, it is noted that the post 203 extends through a hole 95b in the modified long arm 95a of the scissors mechanism, which may be identical to that illustrated in FIG. 8 except for the modification that the long arm 95a is straight, with the hole 95b at its end, rather than having the bent finger 141 at its end, as shown in FIG. 11A, for example. For reasons which will become immediately apparent, the hole 95b is sufficiently large to allow the post to rock inside the hole. A retaining clip 205, at the end of the post, may be provided to ensure that the post remains in the long arm 95a at all times.

Figure 12A:
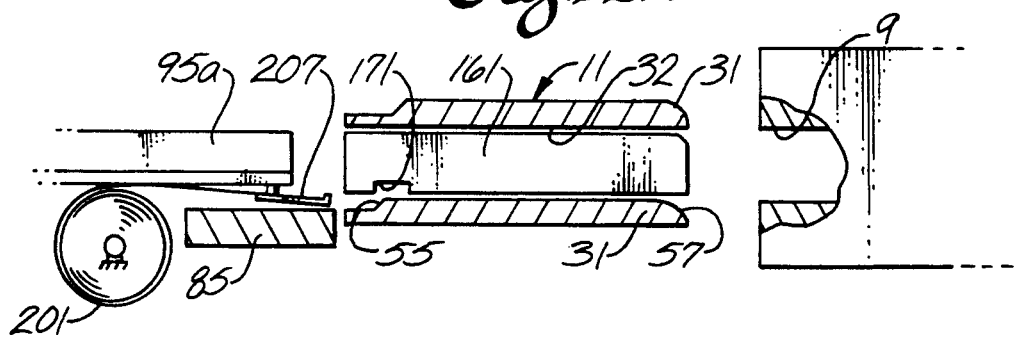
FIGS. 12A-12H are a series of cross-sectional schematic views of an alternative embodiment of the invention utilizing a constant-force spring.
Figure 12B:
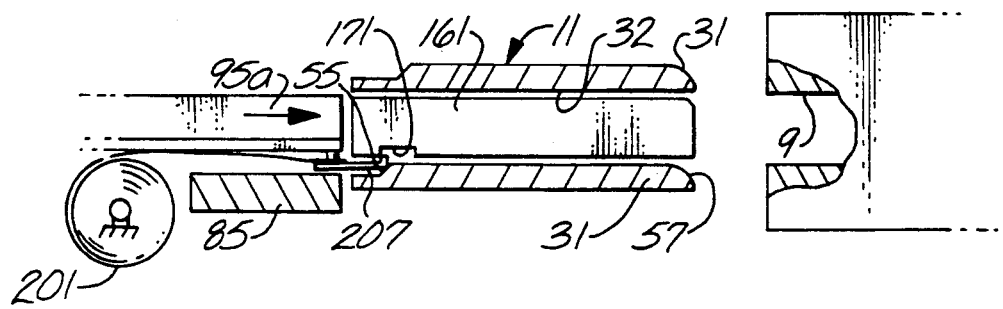
Figure 13:
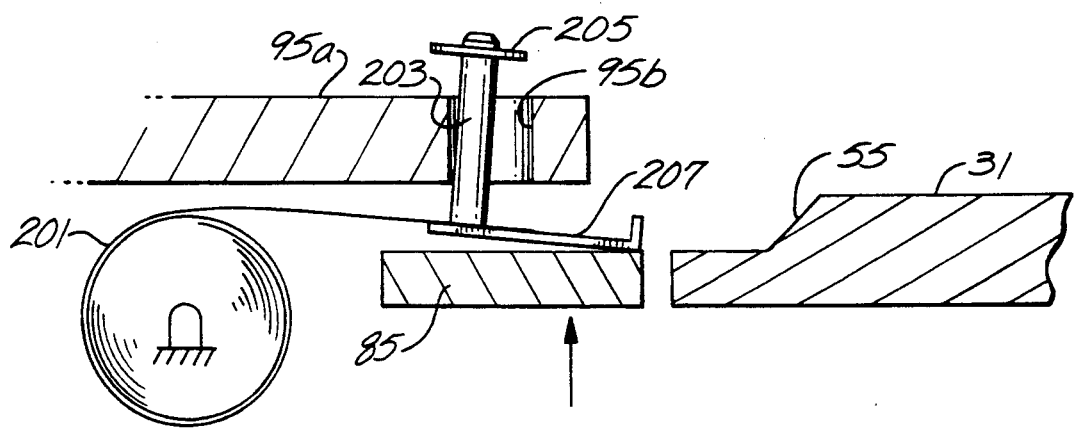
FIG. 13 is an enlarged portion of FIG. 12A showing the latch parked on its ledge.
Figure 14:
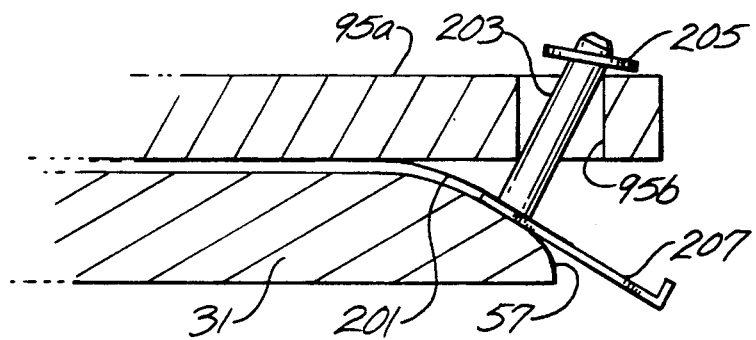
FIG. 14 is an enlarged portion of FIG. 12E showing the latch biased away from a cassette by the constant-force spring when the scissors mechanism is fully extended.

The initial position of the modified push/pull mechanism is shown in FIG. 12A. The arm 95a is fully retracted, and the hook 207 rests on the ledge 85 next to the magazine 11. As is best seen in FIG. 13, the post 203 rests upright n the arm hole 95b. When the arm 95a begins to advance toward the magazine 11 (FIG. 12B), the natural bias of the constant-force spring urges the latch 207 against the ledge 85 and the bottom of the shelf slot 47. Furthermore, since the latch 207 is welded to the end of the spring 201, the latch is kept in alignment such that its longitudinal axis is at right angles to the cassette recess 171. Indeed, since the latch 207 is thus kept in its desired orientation, it need no longer rely on the slot 47 in the shelf 31 to keep it in alignment as was the case with the first-disclosed embodiment. So, whereas, in the first-disclosed embodiment, the latch 207 is biased away from the cassette 161 and against the shelf 31 by the compression spring 147 and is aligned in its desired orientation by means of the slots in the ledge 85 and the magazine shelf 31, in the second embodiment both the biasing and aligning functions are performed by the same element—the constant-force spring 201.

Figure 12C:
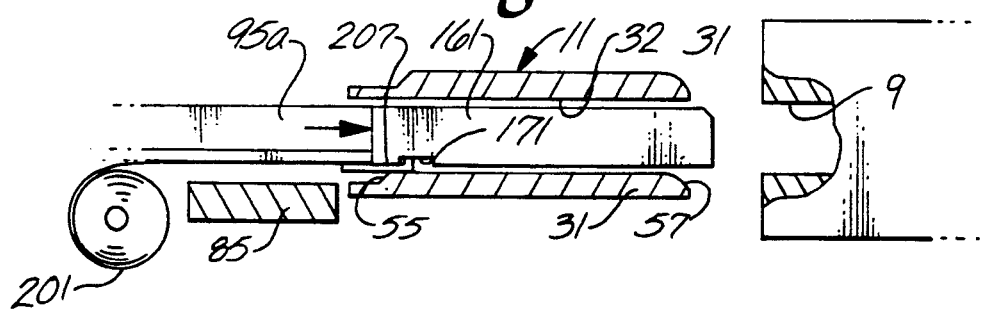
Figure 12D:
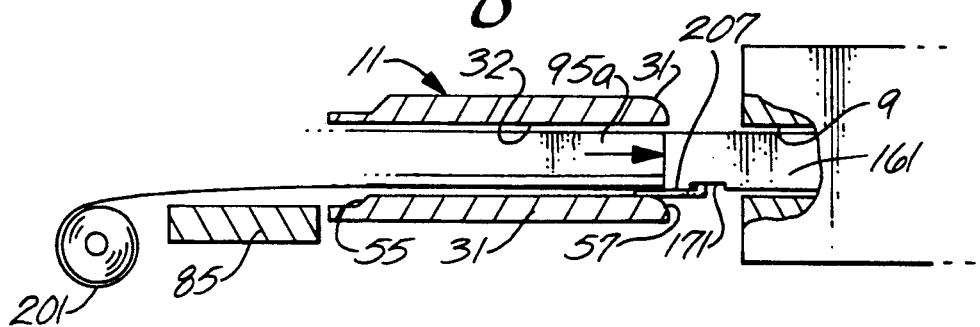
Figure 12E:
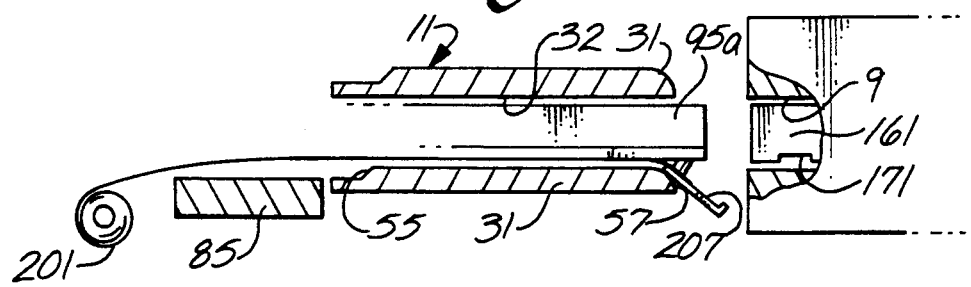
Figure 12F:
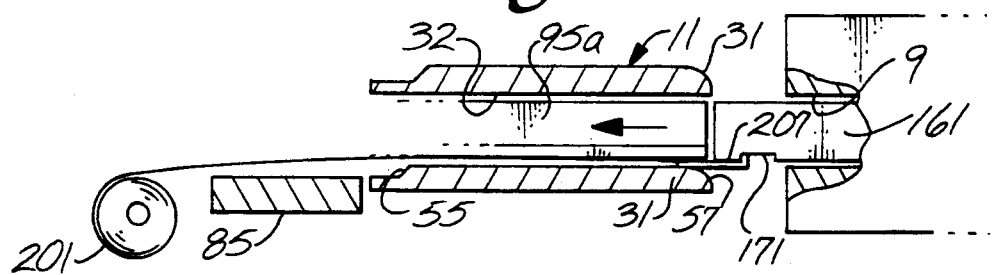
Figure 12G:
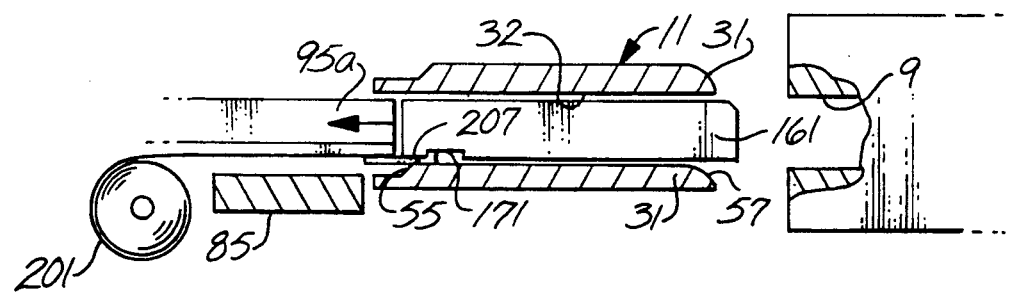
Figure 12H:
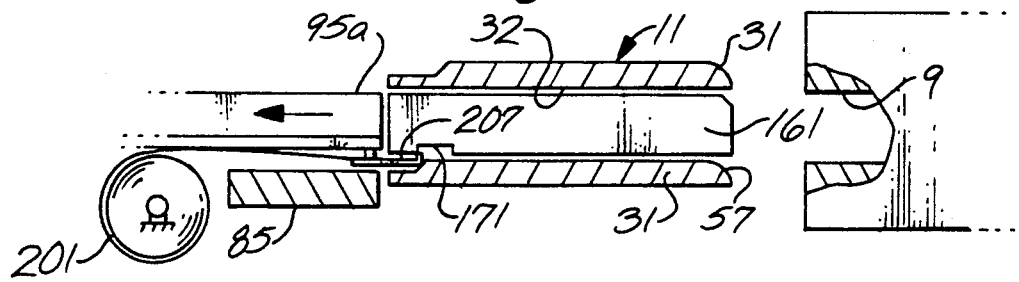

As the long arm 95a continues to advance by operation of the scissors mechanism, in the same manner explained with respect to the first embodiment (FIGS. 10 and 11), the latch 207 rides up the front ramp 55 and enters the cassette front recess 171 as before. The front end of the long arm 95a of the scissors mechanism 73 directly abuts the cassette 161 and begins to push it toward the DAT drive inlet 9 (FIGS. 12B, 12C). When the arm 95a reaches the rear end of the magazine 11 (FIGS. 12D, 12E), the latch 207 is biased away from the cassette 161, as particularly shown in FIG. 14, by the force of the constant-force spring 201. In this position, the post 203 is tilted within the long arm hole 95b, and the latch 207 rests against the rear sloping surface 57 of the shelf 32. Because of the different configuration of the latch 207, and because it is now biased away from the cassette 161 by the constant-force spring 201 rather than by the rocking action of the rear ramp 57, the ramp 57 may simply assume a curved lip shape, as shown in FIGS. 12A-12H and in FIG. 13. The cassette 161 is now in the DAT drive. When the cassette 161 is thereafter ejected back into the magazine 11 (FIG. 12F), ejection of the cassette is sensed in the same manner as described previously. The motor 75 is activated and withdraws the long arm 95 and with it, the latch 207. The latch 207 then rides back up the shelf slope 57, reenters the cassette slot 171 (FIG. 12F), pulls the cassette 161 back into the magazine chamber 32 (FIG. 12G), and escapes the cassette recess 171 by sliding back down the front ramp 55 and back onto the parking ledge 85 (FIG. 12H).

In summary, there has been provided a cassette loading and unloading apparatus by which a selected one of a plurality of cassettes may be inserted into and received from a DAT cassette drive. By virtue of its scissors-driven push-pull mechanism, the apparatus is compact, since not much additional lateral space is required for the scissors drive when it is fully retracted, in front of the cassette magazine from which it loads and unloads cassettes. Forming an important part of the loading and unloading apparatus is the novel scissors mechanism, which combines compactness with straight-line motion, allowing it to push cassettes out of the magazine without tilting them. Combined with the scissors mechanism, in accordance with another feature of the invention, is the provision of a biased latch adapted to hook into the recess which is characteristic of DAT cassettes.

A further inventive aspect of the invention is the provision of the magazine with its uniquely-configured shelves with which the latch cooperates to enter and leave the cassette recess with which the latch cooperates to pull it from the DAT drive inlet. While in its preferred mode, the latch is biased by means of a compression spring, an alternative version, pursuant to which the latch is both biased and aligned by means of a constant-force spring which is unwound as the scissors mechanism extends into the magazine chamber holding a cassette, is also disclosed.

All aspects of the invention have been described in the context of a DAT cassette. It will be understood that the invention is not limited to the handling of that type of cassette, but that it would be equally suitable for use with any cassette which has a recess along its side similar to the recess characteristic of DAT cassettes.

What is claimed is:

1. A tape cassette loading/withdrawal apparatus for loading into the inlet of a tape cassette drive, a tape cassette having an exterior recess along one of its walls, and for withdrawing said tape cassette from said drive inlet, said loading/withdrawal apparatus comprising:
    a magazine having at least one chamber for holding a tape cassette comprising:
       front and rear openings;
       a floor and ceiling; and
       a slot running the length of said floor;
    means for positioning said magazine with its chamber opposite said drive inlet;
    latching means adapted to engage the exterior recess of a cassette held in said chamber, and to disengage the exterior recess when the cassette is in the tape cassette drive inlet wherein said latching means rides in said slot when in engagement with the exterior recess of the cassette,
    means for pushing said cassette out of said chamber through its rear opening, with the latching means in engagement with the exterior recess, and into said drive inlet, whereupon the latching means disengages the exterior recess; and
    means external to said magazine for driving said pushing means and said latching means from a resting position outside of said chamber into said chamber through its front opening and, within said chamber, toward and away from said tape cassette drive so that said pushing means is operative to move said cassette into said cassette drive and so that said latching means is operative to engage the exterior recess and to pull said cassette from said cassette drive into said chamber through its rear opening.

2. The loading mechanism of claim 1, wherein:
    (a) said magazine chamber has a camming surface facing said cassette recess and running between the front and rear openings of said chamber;
    (b) said latching means has a cam follower portion riding against said camming surface and a latching tip extending into said cassette recess when said cam follower is urged by said camming surface to move said latching tip into engagement with said cassette recess; and
    (c) said apparatus additionally includes means for biasing said latching means away from engagement of its latching means tip with said cassette recess.

3. The loading mechanism of claim 1, wherein said magazine chamber has a floor and a ceiling, one of which is faced by said cassette recess when said cassette is inserted in said chamber, and a slot running the length of that one of said floor and ceiling which is faced by said cassette slot, said slot having ramps near its opposite ends, and wherein said latching means rides in said slot while engaged with the exterior recess of said cassette.

4. The loading mechanism of claim 3, wherein said latching means is resiliently mounted on said driving means so that, when driven into said chamber, said latching means enters and leaves said cassette recess by riding on the ramps of said slot.

5. The loading mechanism of claim 2, wherein said means for biasing is a constant-force spring having an outer end on which said latching means is mounted.

6. The loading mechanism of claim 5, wherein said means for driving is operative to retract said latching means from said chamber after pulling a cassette from said drive into said chamber and said constant-force spring is anchored adjacent said magazine so that it is wound when said latching means is retracted from said chamber and unwound when said latching means is driven into said chamber.

7. The loading mechanism of claim 6, wherein said driving means moves between an extended position toward the rear of said chamber and a retracted position in front of said chamber and wherein said latching means emerges from the rear of said chamber when said driving means is extended and emerges from the front of said chamber when said driving means is retracted.

8. The loading mechanism of claim 2, wherein said latching means is rockably anchored on said pushing means for movement therewith and said biasing means is a spring compressed between said latching means and said pushing means.

9. The loading mechanism of claim 8, wherein said latching means includes a flat slide portion having a width sized to fit closely within said slot so as to become aligned thereby and terminating in an end extending at an angle from said stem for engaging said cassette recess.

10. The loading mechanism of claim 1, wherein said driving means includes a scissors mechanism having an output arm driven at one end and carrying said pushing means at its opposite end into said chamber when said scissors mechanism is extended and out of said chamber when said scissors mechanism is retracted.

11. The loading mechanism of claim 10, wherein said scissors mechanism further includes a link pivotably attached at one end to an intermediate point of said output arm, said link at least partially entering said chamber when said scissors mechanism is extended.

12. The loading mechanism of claim 11, wherein said chamber is rectangular in cross-section and symmetrical about a center plane running through its front and rear openings, and wherein said link is anchored to rotate about a fixed pivot point that lies in said plane adjacent the front opening of said chamber.

13. The loading mechanism of claim 12, wherein a common plane which is orthogonal to said first plane extends through said inlet, through said chamber positioned opposite said inlet, and through said pushing means.

14. The loading mechanism of claim 13, wherein said output arm moves said pushing means in a straight line defined by the intersection of said first and second planes.

15. The loading mechanism of claim 1, wherein said driving means has an extended position in which said pushing means is in said chamber and a retracted position in which said pushing means is withdrawn from said chamber and wherein said driving means includes an output arm which is swung in the principal plane of said chamber as said driving means goes from its retracted position to its extended position.

16. The loading mechanism of claim 1, wherein said latching means has an elongate body configured to nonrotatably slide within said slot in alignment therewith, and wherein said latching means is rotatably mounted with respect to said arm so that, as said arm swings in the principal plane of said chamber, said latching means may remain in alignment with said slot.

17. The loading mechanism of claim 1, wherein said slot has a ramp near its opposite ends, and wherein said latching means rides upon one of said ramps toward engagement with said cassette recess as said latching means is inserted into said chamber through its front opening and rides upon the other of said ramps away from engagement with said cassette recess as said latching means approaches the rear opening of said chamber.

18. The loading mechanism of claim 17, wherein said slot comprises a shallow central region and two deeper terminal regions at its opposite ends, each terminal region being connected to said central region by one of said ramps.

19. The loading mechanism of claim 18, wherein said latching means includes a flat portion terminating in a tip which extends at an angle from said flat portion, said tip being fully recessed within said slot when said flat portion lies at least partially within one of said terminal regions of said slot.

20. A loading/withdrawal apparatus for loading into an inlet of a tape cassette drive, a tape cassette having an exterior recess along one of its walls, and for withdrawing said tape cassette from said drive inlet, a loading mechanism comprising:
a magazine comprising at least one chamber for holding a tape cassette, said chamber comprising:
front and rear openings;
means for positioning said magazine with the rear opening of said chamber opposite said drive inlet;
a floor and a ceiling, one of which is faced by said cassette recess when said cassette is inserted in said chamber; and
a slot, for accommodating a latching means, running the length of that one of said floor or ceiling; and
a cassette transport mechanism comprising:
latching means adapted to engage the exterior recess of a cassette held in said tape drive inlet;
means for pushing said cassette out of said chamber through its rear opening and into said drive inlet, the latching means disengaging the exterior recess when the cassette is in the tape drive inlet; and
means external to said magazine adjacent the front opening of said chamber for driving said pushing means and said latching means from a resting position outside of said chamber into said chamber through its front opening and, within said chamber, toward and away from said tape cassette drive so that said pushing means is operative to move said cassette into said cassette drive and so that said latching means is operative to engage the exterior recess and to pull said cassette from said cassette drive into said chamber through its rear opening.

21. The loading mechanism of claim 20, wherein said latching means is resiliently mounted on said driving means so that, when driven into said chamber, said latching means engages and disengages said cassette recess by riding on the ramps of said slot.

22. The loading mechanism of claim 20, wherein:
(a) said magazine chamber has a camming surface facing said cassette recess and running between the front and rear openings of said chamber;
(b) said latching means has a cam follower portion riding against said camming surface and a latching tip extending into said cassette recess when said cam follower is urged by said camming surface to move said latching tip into engagement with said cassette recess; and
(c) said apparatus additionally includes means for biasing said latching means away from engagement of its latching tip with said cassette recess.

23. The loading mechanism of claim 22, wherein said driving means includes a scissors mechanism driven between extended and retracted positions by a motor, and wherein said means for biasing is a constant-force spring having an outer end on which said latching means is mounted and which is wound when said scissors mechanism is retracted and unwound when said scissors mechanism is extended.

24. The loading mechanism of claim 23, wherein said means for driving is operative to retract said latching means from said chamber after pulling a cassette from said drive into said chamber and said constant-force spring is anchored adjacent said magazine so that it is wound when said latching means is retracted from said chamber and unwound when said latching means is driven into said chamber.

25. The loading mechanism of claim 24, wherein said driving means moves between an extended position toward the rear of said chamber and a retracted position in front of said chamber and wherein said latching means emerges from the rear of said chamber when said driving means is extended and emerges from the front of said chamber when said driving means is retracted.

26. The loading mechanism of claim 22, wherein said latching means is rockably anchored on said pushing means for movement therewith and said biasing means is a spring compressed between said latching means and said pushing means.

27. The loading mechanism of claim 26, wherein said latching means includes a flat slide portion having a width sized to fit closely within said slot so as to become aligned thereby and terminating in an end extending at an angle from said stem for engaging said cassette recess.

28. The loading mechanism of claim 20, wherein said driving means includes a scissors mechanism having an output arm driven at one end and carrying said pushing means at its opposite end into said chamber when said scissors mechanism is extended and out of said chamber when said scissors mechanism is retracted.

29. The loading mechanism of claim 28, wherein said scissors mechanism further includes a link pivotably attached at one end to an intermediate point of said output arm, said link at least partially entering said chamber when said scissors mechanism is extended.

30. The loading mechanism of claim 29, wherein said chamber is rectangular in cross-section and symmetrical about a center plane running through its front and rear openings, and wherein said link is anchored to rotate about a fixed pivot point that lies in said plane adjacent the front opening of said chamber.

31. The loading mechanism of claim 30, wherein a common plane which is orthogonal to said first plane extends through said inlet, through said chamber positioned opposite said inlet, and through said pushing means.

32. The loading mechanism of claim 31, wherein said output arm moves said pushing means in a straight line defined by the intersection of said first and second planes.

33. The loading mechanism of claim 20, wherein said driving means has an extended position in which said pushing means is in said chamber and a retracted position in which said pushing means is withdrawn from said chamber and wherein said driving means includes an output arm which is swung in the principal plane of said chamber as said driving means goes from its retracted position to its extended position.

34. The loading mechanism of claim 33, wherein said magazine chamber has a floor and a ceiling, one of which is faced by said cassette recess when said cassette is inserted in said chamber, and a slot running the length of that one of said floor and ceiling which is faced by said cassette slot, and wherein said latching means rides in said slot in engagement with the exterior recess of said cassette.

35. The loading mechanism of claim 34, wherein said slot has a ramp near its opposite ends, and wherein said latching means rides upon one of said ramps toward engagement with said cassette recess as said latching means is inserted into said chamber through its front opening and rides upon the other of said ramps away from engagement with said cassette recess as said latching means approaches the rear opening of said chamber.

36. The loading mechanism of claim 34, wherein said latching means has an elongate body configured to nonrotatably slide within said slot in alignment therewith, and wherein said latching means is rotatably mounted with respect to said arm so that, as said arm swings in the principal plane of said chamber, said latching means may remain in alignment with said slot.

37. The loading mechanism of claim 35, wherein said slot comprises a shallow central region and two deeper terminal regions at its opposite ends, each terminal region being connected to said central region by one of said ramps.

38. The loading mechanism of claim 37, wherein said latching means includes a flat portion terminating in a tip which extends at an angle from said flat portion, said tip being fully recessed within said slot when said flat portion lies at least partially within one of said terminal regions of said slot.

* * * * *

UNITED STATES PATENT AND TRADEMARK OFFICE
CERTIFICATE OF CORRECTION

PATENT NO. : 5,157,565
DATED : October 20, 1992
INVENTOR(S) : Douglas R. Domel

It is certified that error appears in the above-identified patent and that said Letters Patent is hereby corrected as shown below:

On title page, item

[56] References Cited, U.S. PATENT DOCUMENTS,
"4,787,533 11/1998 Haroutel et al .. 221/12" should read
-- 4,787,533 11/1988 Haroutel et al .. 221/12 --.

In the Claims:

Column 5, line 40, before "hole" change "ca" to -- cap --.

Column 9, line 63, after "configured," insert
-- having a flat body terminating in a short finger --.

Column 10, line 19, after "upright" change "n" to -- in --.

Signed and Sealed this

Twelfth Day of April, 1994

*Attest:*

BRUCE LEHMAN

*Attesting Officer*

Commissioner of Patents and Trademarks